US010803395B2

(12) United States Patent
Pistoia et al.

(10) Patent No.: US 10,803,395 B2
(45) Date of Patent: Oct. 13, 2020

(54) QUANTUM COMPUTATIONS OF CLASSICAL SPECIFICATIONS

(71) Applicant: International Business Machines Corporation, Armonk, NY (US)

(72) Inventors: Marco Pistoia, Amawalk, NY (US); Jay M. Gambetta, Yorktown Heights, NY (US); Antonio Mezzacapo, Westchester, NY (US); Richard Chen, Mount Kisco, NY (US); Stephen Wood, Thornwood, NY (US); Peng Liu, Yorktown Heights, NY (US); Shaohan Hu, Yorktown Heights, NY (US); Julia Elizabeth Rice, Sunnyvale, CA (US); Ivano Tavernelli, Wädenswil (CH); Rudy Raymond Harry Putra, Yokohama (JP); Panagiotis Barkoutsos, Zurich (CH); Nikolaj Moll, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/002,655

(22) Filed: Jun. 7, 2018

(65) Prior Publication Data

US 2019/0378047 A1 Dec. 12, 2019

(51) Int. Cl.
*G06N 10/00* (2019.01)
*G06F 17/14* (2006.01)

(52) U.S. Cl.
CPC ............ *G06N 10/00* (2019.01); *G06F 17/14* (2013.01)

(58) Field of Classification Search
None
See application file for complete search history.

(56) References Cited

U.S. PATENT DOCUMENTS 8,190,553 B2 5/2012 Routt
8,581,227 B2 11/2013 Freedman et al.
(Continued)

FOREIGN PATENT DOCUMENTS

CA 2 470 715 A1 7/2003

OTHER PUBLICATIONS

McClean, et al., OpenFermion: The Electronic Structure Package for Quantum Computers, Mar. 6, 2018, 19 Pages.
(Continued)

*Primary Examiner* — Michael D. Yaary
(74) *Attorney, Agent, or Firm* — Amin, Turocy & Watson, LLP

(57) ABSTRACT

Systems, computer-implemented methods, and computer program products to facilitate quantum domain computation of classical domain specifications are provided. According to an embodiment, a system can comprise a memory that stores computer executable components and a processor that executes the computer executable components stored in the memory. The computer executable components can comprise an input transformation component that can be adapted to receive one or more types of domain-specific input data corresponding to at least one of a plurality of domains. The input transformation component can transform the one or more types of domain-specific input data to quantum-based input data. The computer executable components can further comprise a circuit generator component that, based on the quantum-based input data, can generate a quantum circuit.

25 Claims, 14 Drawing Sheets

(56) References Cited

U.S. PATENT DOCUMENTS

| | | | |
|---|---|---|---|
| 9,495,644 B2 | 11/2016 | Chudak et al. | |
| 2003/0121028 A1* | 6/2003 | Coury | B82Y 10/00 |
| | | | 717/138 |
| 2014/0365843 A1* | 12/2014 | Ashikhmin | H03M 13/1148 |
| | | | 714/758 |
| 2015/0324705 A1* | 11/2015 | Biercuk | G06F 3/0673 |
| | | | 711/101 |
| 2016/0283857 A1 | 9/2016 | Babbush et al. | |
| 2018/0053112 A1 | 2/2018 | Bravyi et al. | |
| 2018/0276555 A1* | 9/2018 | Weichenberger | G06N 10/00 |
| 2018/0307988 A1* | 10/2018 | Fano | G06N 10/00 |
| 2019/0080255 A1* | 3/2019 | Allen | G06N 20/00 |

OTHER PUBLICATIONS

McCaskey, et al., Hybrid Programming for Near-Term Quantum Computing Systems, International conference on Rebooting computing, May 2018, 9 Pages.

Van Meter III, Architecture of a Quantum Multicomputer Optimized for Shor's Factoring Algorithm, Jul. 11, 2016, 256 Pages.

Omer, Quantum Programming in QCL, Jan. 20, 2000, 109 Pages.

Anonymous, Machine-Learning for Optimization of Software Parameters, An IP.com Prior Art Database Technical Disclosure, Dec. 13, 2017, 35 Pages.

International Search Report and Written Opinion received for PCT Application Serial No. PCT/EP2019/064186 dated Sep. 5, 2019, 15 pages.

Häner et al., "A Software Methodology for Compiling Quantum Programs", URL:https://arxiv.org/pdf/1604.01401.pdf, May 11, 2016, pp. 1-14.

Steiger et al., "ProjectQ: An Open Source Software Framework for Quantum Computing", Cornell University Library, Jan. 29, 2018, pp. 1-13.

Wecker et al., "LIQUi|>: A Software Design Architecture and Domain-Specific Language for Quantum Computing", Cornell University Library, Feb. 18, 2014, 14 pages.

Cross et al., "Open Quantum Assembly Language", Cornell University Library, Jul. 13, 2017, pp. 1-24.

Kandala, et al., Hardware-effcient Variational Quantum Eigensolver for Small Molecules and Quantum Magnets, Oct. 13, 2017, 24 Pages.

\* cited by examiner

Applications, Quantum Algorithms and Supporting Components

| Features | Assets | | | | |
|---|---|---|---|---|---|
| Assets | 1. Domain-independent Library of Quantum Algorithms | 2. Multiple Domain-specific Applications | | | |
| Applications | 1. Chemistry | 2. Artificial Intelligence | 3. Optimization | | |
| Drivers | 1. PSI4 | 2. PySCF | 3. PyQuante | 4. Gaussian | 5. HDF5 |
| Operating Systems | 1. macOS | 2. Linux | 3. UNIX | 4. Windows | |
| Fermionic Operators | Transformations | | Qubit Mappings | | |
| | 1. Full | 2. Particle Hole | 1. Jordan-Wigner | 2. Parity | 3. Bravyi-Kitaev |
| Quantum Algorithms | 1. Variational Quantum Eigensolver (VQE) 2. k Eigenvalue Decomposition (VQkE) 3. Dynamics | | 4. Quantum Phase Estimation (QPE)    a. With Quantum Fourier Transform (QFT)    b. With Approximate QFT (AQFT) 5. Iterative QFT | 5. Grover 6. SVM Q Kernel 7. SVM Variational | |
| Optimizers | Local | | | Global | |
| | 1. Nelder-Mead 2. Powell 3. CG | 4. TNC 5. SLSQP 6. COBYLA | 7. SPSA 8. L_BFGS_B 9. P_BFGS | 1. Direct_L 2. Direct_L_Rand 3. CRS2_LM | 4. ISRES 5. ESCH |
| Variational Forms | 1. RYRZ | | 2. RY | 3. UCCSD | 4. SWAPRZ |
| Chemistry Problems | 1. Molecular Ground-state Energy | 2. Dipole Moment | 3. Excited States | 4. Total Spin | |
| Resource Optimization | 1. Support for Orbital Reduction    a. Via Frozen Core Computation    b. Via Virtual Orbital Removal | | 2. Parity-map-based Precision-preserving Two-qubit Reduction | | |
| User Interfaces | 1. Command Line with Automatic Input Validation 2. GUI with Automatic Input Generation and Validation 3. Documentation GUI | | | 4. Programmable Entrypoint with Automatic Input Generation and Validation, and Plot Generation | |
| Documentation | 1. General documentation of all the components included | | 2. Performance and accuracy comparison study | | 3. Tuning |

FIG. 7

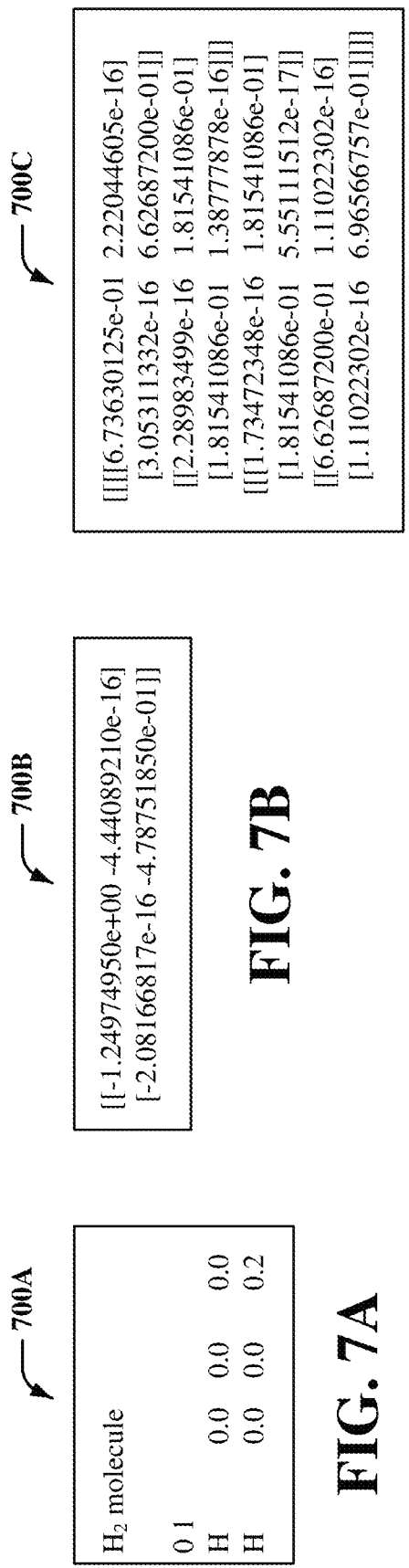

```
700E

&HAMILTONIAN
TYPE=FULL
TRANSFORMATION_TO_SPIN=PARITY
&END
&QUANTUM_METHOD
NAME_Q_METHOD=VQE
&END
```

OPENQASM 2.0;
include "qelib1.inc";
qreg q[4];
creg c[4];
barrier q[0],q[1],q[2],q[3];
cz q[0],q[1];
cz q[0],q[2];
cz q[0],q[3];
cz q[1],q[0];
cz q[1],q[2];
cz q[1],q[3];
cz q[2],q[0];
cz q[2],q[1];
cz q[2],q[3];        ← Redundancies
cz q[2],q[3];             702
cz q[3],q[0];
cz q[3],q[1];
cz q[3],q[2];
ry(1.6021805151741816) q[0];
rz(2.1015783398242260) q[0];
ry(-1.9463735877370641) q[1];
rz(0.7583629745519232) q[1];
ry(-0.3215684478820939) q[2];
rz(0.7354014745444032) q[2];
ry(-3.9854727064676653) q[3];
rz(-3.6218968790296187) q[3];
barrier q[0],q[1],q[2],q[3];
cz q[0],q[1];
cz q[0],q[2];
cz q[0],q[3];
cz q[1],q[0];
cz q[1],q[2];
cz q[1],q[3];
cz q[2],q[0];
cz q[2],q[1];
cz q[2],q[3];        ← Redundancies
cz q[2],q[3];             702
cz q[3],q[0];
cz q[3],q[1];
cz q[3],q[2];
ry(-1.9563653947331121) q[0];
rz(2.7824349178829299) q[0];
ry(2.1655125855089744) q[1];
rz(-2.6658091608897366) q[1];
ry(2.9040984381626770) q[2];
rz(-1.1206892158413140) q[2];
ry(5.0940504674406453) q[3];
rz(-2.6157350234961330) q[3];
barrier q[0],q[1],q[2],q[3];
```

FIG. 7F

QUANTUM COMPUTATIONS OF CLASSICAL SPECIFICATIONS

BACKGROUND

The subject disclosure relates to quantum computation, and more specifically, to quantum domain computations of classical domain specifications.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires very specialized skills to, for example, program a quantum computer. Problems that can benefit from the power of quantum computing, and for which no computational solution has been discovered in the general case on classical computers, have been identified in numerous domains, such as chemistry, artificial intelligence, optimization, and finance.

Industry-domain experts, who are likely familiar with existing computation software specific to their own domain, can benefit from quantum computing in terms of performance, accuracy, and computational complexity. Such experts want to use existing computational software specific to their domain as a front-end to a quantum computing system. Such experts may also want to use, as inputs to such existing front-end domain-specific computation software, various problem configurations they have collected over time that correspond to various experiments they conducted. Consequently, there exists a need for a computing system that enables classical computational software specific to various domains to: accept the same configuration files used in classic domains, with no modifications; and without requiring a practitioner experienced in a certain domain to learn a quantum programming language; automatically execute some computationally inexpensive computations on a classical computer; and automatically delegate computationally expensive computations to a quantum infrastructure. However, existing prior art computing systems do not provide such functionality.

Another problem with existing prior art computing systems is that they can only employ classical computational software specific to one domain, chemistry. Such existing computing systems are not extensible to a plurality of domains. Further, such existing computing systems are not modular or extensible at every level of the software stack, allowing for practitioners with different levels of expertise to dynamically contribute components at different levels of the software stack.

Additional problems with existing prior art computing systems is that they do not provide for generation of quantum circuit models and execution of such quantum circuit models within the system. Instead, existing prior art computing systems employ remote, third-party quantum computing resources and infrastructures outside the system to facilitate generation and execution of quantum circuit models. This approach generates unnecessary complexity to the overall execution.

Other problems with some existing computing systems is that they only allow for interfacing third-party quantum algorithms and backends, but such systems do not offer a full software and hardware stack system. Existing computing systems that allow for such interfaces are problematic and cumbersome, as they require the end user to overcome complex configuration challenges associated with, for example, mapping or remapping various components of the existing computing system and/or the plug-in components. Moreover, such existing computing systems require the end user to learn either one or more new programming languages, for example, quantum-computing-specific programming languages, or one or more new Application Programming Interfaces (APIs) in existing languages. Both of these options often require in-depth knowledge and specialized skills. In addition, such existing computing systems that offer the algorithm and backend plug-in option or require the end user to learn a quantum programming language do not offer a configuration validation feature to ensure that all data input to the system and all components are correctly configured. This is a problematic issue because, when dealing with computational applications in a very specialized domain, such as chemistry, artificial intelligence, optimization or finance, and when the complex operations of such applications have to be delegated to a quantum infrastructure, a problem configuration involves setting values for both application- and quantum-specific parameters. Such configurations can become fairly complex, and are often tedious, time consuming, and extremely error prone.

Another problem with existing systems is that, although they may offer an extensible interface allowing existing computational software programs to be plugged in and classically executed in order to perform computationally inexpensive operations, they do not allow those programs to be accessible by the user because, as explained above, their systems require the input to the computation to be passed through a program written in a new programming language, or an existing programming language with new specialized APIs. This approach has a significant functionality disadvantage in that the additional interface built on top of the classical computational software limits the capabilities of the underlying classical software in that only those capabilities exposed by the new language or APIs will be exposed to the user. The complete functionality of the underlying classical software, which is executed to build the input to the quantum infrastructure, may not be fully exposed and used by the system, leading to inaccurate results, or no results at all.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quantum domain computation of classical domain specifications are described.

According to an embodiment, a system can comprise a memory that stores computer executable components and a processor that executes the computer executable components stored in the memory. The computer executable components can comprise an input transformation component that can transform domain-specific input data to quantum-based input data. The computer executable components can further comprise a circuit generator component that, based on the quantum-based input data, can generate a quantum circuit. Such system can have an advantage of providing generation of quantum circuit models within the system. In particular, such a system does not employ remote, third-party quantum computing resources and infrastructures outside the system to facilitate generation of quantum circuit models.

According to an embodiment, a computer program product that can facilitate a quantum domain computation of classical domain specifications process is provided. The computer program product can comprise a computer readable storage medium having program instructions embodied therewith, the program instructions can be executable by a processing component to cause the processing component to transform, by the processor, domain-specific input data to quantum-based input data. The program instructions can further cause the processing component to, based on the quantum-based input data, generate, by the processor, a quantum circuit. Such a computer program product can have an advantage of providing generation of quantum circuit models within the system. In particular, such a computer program product does not employ remote, third-party quantum computing resources and infrastructures outside the system to facilitate generation of quantum circuit models.

According to an embodiment, a system can comprise a memory that stores computer executable components and a processor that executes the computer executable components stored in the memory. The computer executable components can comprise an input transformation component that can be adapted to receive one or more types of domain-specific input data corresponding to at least one of a plurality of domains. The input transformation component can transform the one or more types of domain-specific input data to quantum-based input data. The computer executable components can further comprise a circuit generator component that, based on the quantum-based input data, can generate a quantum circuit. Such system can have an advantage of allowing end users to utilize various domain-specific classical computation software as front-end programs to input problems to be solved by the system. In particular, such a system is not limited to chemistry-specific front-end computation software.

According to an embodiment, a computer-implemented method can comprise transforming, by a system operatively coupled to a processor, one or more types of domain-specific input data to quantum-based input data. The one or more types of domain-specific input data can correspond to at least one of a plurality of domains. The computer-implemented method can further comprise, based on the quantum-based input data, generating, by the system, a quantum circuit. Such a computer-implemented method can have an advantage of allowing end users to utilize various domain-specific classical computation software as front-end programs to input problems to be solved by the system. In particular, such a computer-implemented method is not limited to chemistry-specific front-end computation software.

According to an embodiment, a system can comprise a memory that stores computer executable components and a processor that executes the computer executable components stored in the memory. The computer executable components can comprise a translator component that can translate a Hamiltonian operator to a qubit Hamiltonian operator. The Hamiltonian operator can be generated from domain-specific input data. The computer executable components can further comprise a circuit execution component that can execute a quantum circuit that can be generated based on the qubit Hamiltonian operator. Such system can have an advantage of providing generation of quantum circuit models within the system. In particular, such a system does not employ remote, third-party quantum computing resources and infrastructures outside the system to facilitate generation of quantum circuit models.

DESCRIPTION OF THE DRAWINGS

FIG. 7 illustrates a non-limiting example information of components that facilitate classical domain and quantum domain computations in accordance with one or more embodiments of the disclosed subject matter.

FIG. 7A illustrates a non-limiting example of a classical domain specification that facilitates classical domain computation components in accordance with one or more embodiments of the disclosed subject matter.

FIG. 7B illustrates a non-limiting example of classical domain information that facilitates classical domain computation components in accordance with one or more embodiments of the disclosed subject matter.

FIG. 7C illustrates a non-limiting example of classical domain information that facilitates classical domain computation components in accordance with one or more embodiments of the disclosed subject matter.

FIG. 7D illustrates a non-limiting example of a quantum domain configuration that facilitates quantum domain computation components in accordance with one or more embodiments of the disclosed subject matter.

FIG. 7E illustrates an example, non-limiting declarative-based representation of a quantum domain configuration that facilitates quantum domain computation components in accordance with one or more embodiments described herein.

FIG. 7F illustrates an example, non-limiting representation of a quantum domain circuit that facilitates quantum domain computation components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problem with existing systems limited ability to only provide quantum-based solutions for chemistry-specific problems, the present disclosure can be implemented to produce a solution to this problem in the form of a system comprising various driver components that allow for input of one or more different types of domain-specific problems to be solved by the system. In this description, a driver is a classical computational software program performing computations specific to one or more domains. In addition, given the above problem with existing systems employing remote, third-part quantum computing resources and infrastructure to generate a quantum circuit model, the present disclosure can be implemented to produce a solution to this problem in the form of a complete system comprising a quantum circuit generator component that generates a quantum circuit based on different types of problems specific to different types of domains. Optionally, given the above problem with existing systems employing remote, third-party quantum computing resources and infrastructure to execute a quantum circuit model, the present disclosure can be implemented to produce a solution to this problem in the form of a complete system comprising a quantum circuit execution component that executes a quantum circuit generated by the system based on different types of problems specific to different types of domains.

An advantage of such a system described herein is that it allows for various domain-specific problems to be solved utilizing a quantum computing infrastructure. Another advantage of such a system described herein is that it allows for generation of a quantum circuit, by the system, without employing remote quantum computing resources that must be configured by an entity (e.g., an end user). Additionally, an advantage of such a system described herein is that it allows for execution, by the system, of such quantum circuit generated by the system, without employing remote quantum computing resources that must be configured by an entity (e.g., an end user).

Figure 1:
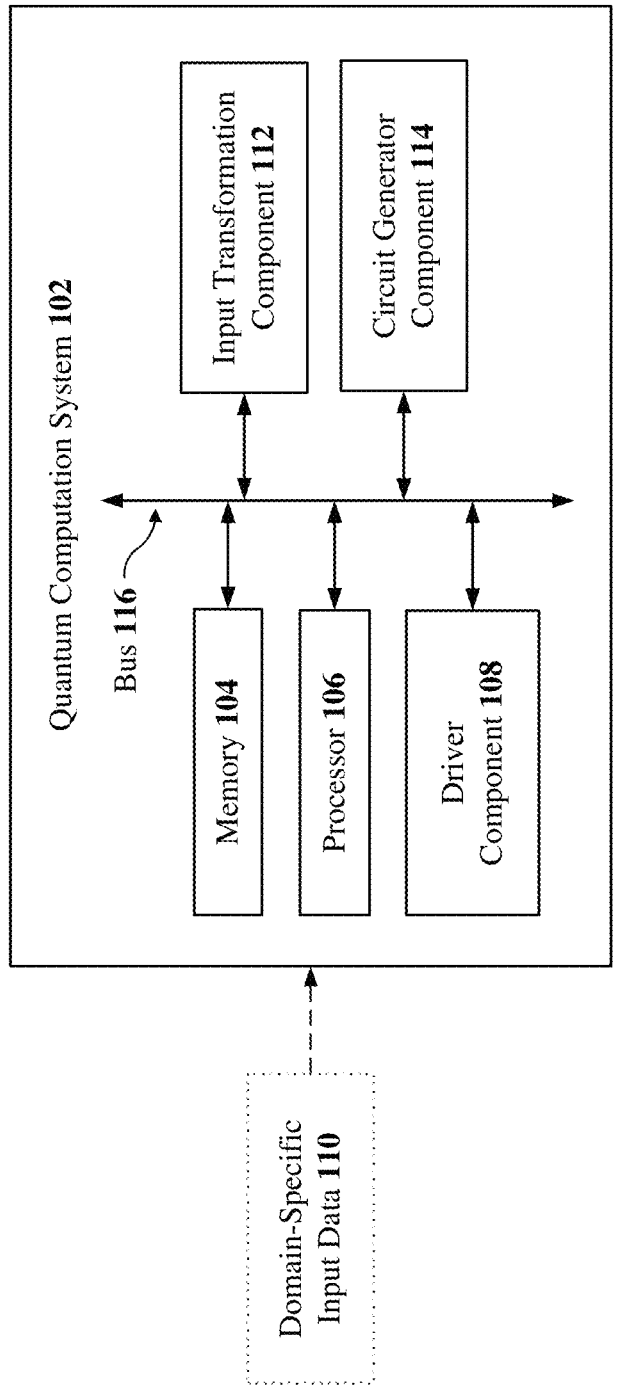
FIG. 1 illustrates a block diagram of an example, non-limiting system that facilitates quantum domain computation of classical domain specifications components in accordance with one or more embodiments described herein.

FIG. 1 illustrates a block diagram of an example, non-limiting system 100 that facilitates quantum domain computation of classical domain specifications components in accordance with one or more embodiments described herein. In FIG. 1, one or more components are depicted with dashed lines to indicate that, according to some embodiments, such components represent various input and/or output data that can be transferred, received, generated, and/or manipulated by one or more components of system 100. According to several embodiments, system 100 can comprise a quantum computation system 102. In some embodiments, quantum computation system 102 can comprise a memory 104, one or more processors 106, one or more driver components 108, an input transformation component 112, a circuit generator component 114, and/or a bus 116. In some embodiments, quantum computation system 102 can be adapted to receive domain-specific input data 110.

It should be appreciated that the embodiments of the subject disclosure depicted in various figures disclosed herein are for illustration only, and as such, the architecture of such embodiments are not limited to the systems, components, devices, and/or aspects depicted therein. For example, in some embodiments, system 100 and/or quantum computation system 102 can further comprise various computer and/or computing-based elements described herein with reference to operating environment 1000 and FIG. 10. In several embodiments, such computer and/or computing-based elements can be used in connection with implementing one or more of the systems, components, devices, and/or aspects shown and described in connection with FIG. 1 or other figures disclosed herein.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum computation system 102, driver component 108, domain-specific input data 110, input transformation component 112, and/or circuit generator component 114.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. In some embodiments, processor 106 can comprise one or more quantum processor (e.g., a quantum processing device that executes processing tasks based on quantum-mechanical phenomena using quantum bits), quantum computer, quantum hardware, and/or another type of quantum processor.

In some embodiments, quantum computation system 102, memory 104, processor 106, driver component 108, input transformation component 112, and/or circuit generator component 114 can be communicatively, electrically, and/or operatively coupled to one another via a bus 116 to perform functions of system 100, quantum computation system 102, and/or any components coupled therewith. In several embodiments, bus 116 can comprise one or more memory bus, memory controller, peripheral bus, external bus, local bus, and/or another type of bus that can employ various bus architectures. Further examples of bus 116 are described below with reference to system bus 1018 and FIG. 10. Such examples of bus 116 can be employed to implement any embodiments of the subject disclosure.

In several embodiments, quantum computation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with quantum computation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, driver component 108, input transformation component 112, circuit generator component 114, and/or any other components associated with quantum computation system 102 (e.g., communicatively, electronically, and/or operatively coupled with and/or employed by quantum computation system 102), can comprise such computer and/or machine readable, writable, and/or executable component(s) and/or instruction(s). Consequently, according to numerous embodiments, quantum computation system 102 and/or any components associated therewith, can employ processor 106 to execute such computer and/or machine readable, writable, and/or executable component(s) and/or instruction(s) to facilitate performance of one or more operations described herein with reference to quantum computation system 102 and/or any such components associated therewith.

According to multiple embodiments, quantum computation system 102 can facilitate performance of operations related to and/or executed by driver component 108, domain-specific input data 110, input transformation component 112, and/or circuit generator component 114. For example, as described in detail below, quantum computation system 102 can facilitate: transforming domain-specific input data to quantum-based input data (e.g., via input transformation component 112); and/or based on the quantum-based input data, generating a quantum circuit (e.g., via circuit generator component 114).

In several embodiments, quantum computation system 102 can be adapted to receive one or more types of domain-specific input data 110 corresponding to at least one of a plurality of domains. For example, quantum computation system 102 can receive one or more types of domain-specific input data 110 corresponding to a chemistry domain, an artificial intelligence (AI) domain, a combinatorial optimization (CO) domain, a stochastic optimization (SO) domain, a finance domain, and/or another type of domain. In numerous embodiments, to facilitate receiving one or more types of domain-specific input data 110 corresponding to at least one of such a plurality of domains, quantum computation system 102 can employ one or more driver components 108 to receive such data, and in some embodiments, process such data and/or execute one or more computations based on such data. In several embodiments, quantum computation system 102 can comprise one or more such driver components 108, as illustrated in FIG. 1. In other embodiments, quantum computation system 102 can employ such driver components 108 by establishing a communication and/or operative connection with such driver components 108 over a network, such as the Internet, for example.

According to several embodiments, driver component 108 can comprise one or more domain-specific computer programs, libraries, and/or application programming interfaces (API). Such domain-specific computer programs, libraries, and API's are hereafter referred to as "drivers". In some embodiments, driver component 108 can comprise chemistry-specific drivers including, but not limited to, PSI4, Gaussian, PySCF, PyQuante, and/or another chemistry-specific driver. In some embodiments, driver component 108 can comprise AI-specific drivers including, but not limited to, TensorFlow, PyTorch, Core ML, Weka, DyNet, kernlab, and/or another AI-specific driver. In some embodiments, driver component 108 can comprise CO-specific drivers including, but not limited to, DIMACS, COIN-OR, CPLEX, and/or another CO-specific driver. In some embodiments, driver component 108 can comprise SO-specific drivers including, but not limited to, FortSP, LINDO, and/or another SO-specific driver. In some embodiments, driver component 108 can comprise finance-specific drivers including, but not limited to, Treasury and Capital Markets Solutions, Findur, TimeScape Derivatives/Product Valuation Management, and/or another finance-specific driver.

In several embodiments, quantum computation system 102 and/or driver component 108 can receive domain-specific input data 110 via one or more types of user interfaces of the one or more driver components 108. For example, quantum computation system 102 and/or driver component 108 can be operatively coupled to various computer hardware and/or software components, such as input devices (e.g., mouse, keyboard, etc.), output devices (e.g., display monitor, etc.), an operating system, and/or one or more software applications adapted for inputting domain-specific input data 110 to quantum computation system 102 and/or driver component 108. In some embodiments, quantum computation system 102 and/or driver component 108 can receive domain-specific input data 110 via a user interface comprising a command line with automatic input validation. In some embodiments, quantum computation system 102 and/or driver component 108 can receive domain-specific input data 110 via a graphical user interface (GUI) with automatic input generation and validation. In some embodiments, quantum computation system 102 and/or driver component 108 can receive domain-specific input data 110 via a documentation GUI. In some embodiments, quantum computation system 102 and/or driver component 108 can receive domain-specific input data 110 via a user interface comprising a programmable entry point with automatic input generation, automatic input validation, and/or plot generation.

According to several embodiments, domain-specific input data 110 can comprise one or more different types of domain-specific data corresponding to one or more different domains. In some embodiments, domain-specific input data 110 can comprise one or more classical domain-specific computational specifications and/or classical domain-specific configurations (e.g., input data defined as a problem to be solved by quantum computation system 102). For instance, domain-specific input data 110 can comprise one or more classical domain-specific computational specifications and/or classical domain-specific configurations defined using a general-purpose computer operating in the classical computing domain by utilizing various computer hardware and/or software components (e.g., such components described below with reference to FIG. 10 and operating environment 1000).

In some embodiments, domain-specific input data 110 can comprise domain-specific computational specifications and/or configurations indicative of mathematical functions (e.g., continuous functions), models, variables, and/or equations that can be discretized (e.g., transferred into discrete counterparts) and/or described with a finite number of degrees of freedom. For instance, domain-specific input data 110 can comprise chemistry-specific computational specifications and/or configuration comprising a molecule configuration, a molecular ground-state energy, a basis-set (e.g., Slater-type orbital (STO), such as a STO-3G), dipole moment, excited states, total angular momentum, and/or another chemistry-specific computational specification and/or configuration.

In some embodiments, domain-specific input data 110 can comprise input data required to formulate a domain-specific computational specification and/or configuration. For example, domain-specific input data 110 can comprise AI-specific input data, CO-specific input data, SO-specific input data, finance-specific input data, and/or other domain-specific input data required to formulate a computational specification and/or configuration, such as, for example, a max-cut problem configuration, a Boolean satisfiability problem configuration (e.g., 3SAT), and/or another configuration.

In some embodiments, domain-specific input data 110 can be formatted in a computer and/or machine readable, writable, and/or executable format and/or a human readable format. For example, domain-specific input data 110 can be formatted as a text file. In several embodiments, quantum computation system 102 and/or driver component 108 can facilitate storing domain-specific input data 110 on a local storage component and/or a remote storage component. For example, quantum computation system 102 and/or driver component 108 can employ memory 104 to facilitate storing domain-specific input data 110 as a text file.

According to multiple embodiments, input transformation component 112 can transform domain-specific input data 110 to quantum-based input data. In some embodiments, to facilitate such transformation, input transformation component 112 can employ driver component 108 to generate domain-specific intermediate data formatted in such a manner that it can be transformed (i.e., translated or converted), by input transformation component 112, to quantum-based input data. Additionally, or alternatively, in some embodiments, input transformation component 112 can generate such domain-specific intermediate data and further transform it to quantum-based input data.

In several embodiments, to facilitate transformation of domain-specific input data 110 to quantum-based input data, input transformation component 112 and/or driver component 108 can comprise one or more mathematical functions that, when executed using domain-specific input data 110 as inputs, can generate domain-specific intermediate data that can be represented by one or more domain-specific operators. In such embodiments, input transformation component 112 can further transform such domain-specific operators to quantum-based input data. For example, in the chemistry domain, input transformation component 112 and/or driver component 108 can comprise certain mathematical functions that can receive a molecule configuration and generate domain-specific intermediate data including, but not limited to, one-body integrals and two-body integrals of the Hamiltonian for the molecule, dipole integrals, molecular orbital coefficients and energies, HartreeFock energy, nuclear repulsion energy, and/or other domain-specific intermediate data. For instance, input transformation component 112 and/or driver component 108 can comprise mathematical functions, such as, for example, second quantization, Bogoliubov transformation, and/or other mathematical functions. In this example, input transformation component 112 and/or driver component 108 can employ such mathematical functions to generate one or more fermionic Hamiltonians (i.e. domain-specific operators), which input transformation component 112 can transform to quantum-based input data.

In numerous embodiments, input transformation component 112 can convert domain-specific operators to one or more quantum-based operators, such as, for example, one or more quantum bit operators (also known as qubit operators), thereby completing the transformation of domain-specific input data 110 to quantum-based input data. For example, input transformation component 112 can convert a domain-specific operator to a quantum-based operator (e.g., a qubit operator) by executing one or more mapping operations including, but not limited to, Jordan-Wigner mapping, Bravyi-Kitaev mapping, binary-tree mapping, parity mapping, and/or another mapping operation. For instance, in the chemistry domain example described above, input transformation component 112 can convert a fermionic Hamiltonian operator to a qubit operator via binary-tree mapping and/or parity mapping.

In several embodiments, the one or more quantum-based operators output from input transformation component 112, as described above, can be indicative of domain-independent and/or driver-independent input data that can be input to circuit generator component 114. For example, one or more qubit operators output from input transformation component 112 can be indicative of domain-independent and/or driver-independent input data that can be input to circuit generator component 114.

According to numerous embodiments, circuit generator component 114 can generate a quantum circuit based on quantum-based input data. For example, circuit generator component 114 can generate a quantum circuit based on the quantum-based input data (e.g., a qubit operator) output from input transformation component 112 as described above.

In some embodiments, to facilitate generating a quantum circuit based on quantum-based input data, circuit generator component 114 can comprise one or more quantum algorithms that circuit generator component 114 can employ to generate such a quantum circuit. In some embodiments, such quantum algorithms can be domain-specific quantum algorithms In some embodiments, such quantum algorithms can be domain-independent quantum algorithms In an embodiment for the chemistry domain, circuit generator component 114 can comprise quantum algorithms including, but not limited to, Variational Quantum Eigensolver (VQE) algorithm, Variational Quantum k Eigensolver (VQkE) (also known as k Eigenvalue Decomposition), Quantum Phase Estimation (QPE), Iterative QPE (IQPE), Dynamics, and/or another quantum algorithm. In an embodiment for the AI domain, circuit generator component 114 can comprise quantum algorithms including, but not limited to, approximate quantum Fourier transform, support vector machine, Gaussian processes, and/or another quantum algorithm. In an embodiment for the CO domain, circuit generator component 114 can comprise quantum algorithms including, but not limited to, Grover, VQE, and/or another quantum algorithm. In an embodiment for the SO domain, circuit generator component 114 can comprise quantum algorithms including, but not limited to, VQE, QPE, adiabatic algorithm, and/or another quantum algorithm. In an embodiment for the finance domain, circuit generator component 114 can comprise quantum algorithms including, but not limited to, VQE, QPE, adiabatic algorithm, and/or another quantum algorithm.

In some embodiments, circuit generator component 114 can comprise one or more quantum algorithm subcomponents that circuit generator component 114 can employ to generate a quantum circuit. For example, circuit generator component 114 can comprise one or more quantum algorithm subcomponents including, but not limited to, local and/or global optimizers, variational forms, initial states, and/or another algorithm subcomponent.

In some embodiments, circuit generator component 114 can generate a quantum circuit based on one or more quantum configurations indicative of declarative-based components (e.g., components developed with declarative syntax, as opposed to imperative syntax). For example, circuit generator component 114 can generate a quantum circuit based on one or more declarative-based quantum configurations that can specify the information necessary to generate and/or execute a quantum circuit. For instance, circuit generator component 114 can generate a quantum circuit based on one or more declarative-based quantum configurations that can specify one or more quantum algorithms, quantum algorithm subcomponents, quantum parameters, qubit entanglement parameters, and/or other information required to generate and/or execute a quantum circuit.

In multiple embodiments, such a declarative-based quantum configuration described above can be formatted in a computer and/or machine readable, writable, and/or executable format and/or a human readable format. For example, such a declarative-based quantum configuration can be formatted as a text file comprising one or more textual representations of the information necessary to generate and/or execute a quantum circuit (e.g., a text file comprising JavaScript Object Notation (JSON)). For instance, such a declarative-based quantum configuration can comprise a readable text file format comprising a data serialization language. In other embodiments, such a declarative-based quantum configuration can comprise a readable text file format comprising a declarative language. In still other embodiments, such a declarative-based quantum configuration can comprise a readable text file format comprising automated documentation.

In some embodiments, circuit generator component 114 can generate a quantum circuit based on one or more domain-specific default declarative-based quantum configurations that can specify one or more default quantum algorithms, default quantum algorithm subcomponents, default quantum parameters, default qubit entanglement parameters, and/or other default information required to generate and/or execute a quantum circuit based on the domain-specific input data 110 received by quantum computation system 102 and/or driver component 108. For example, circuit generator component 114 can generate a quantum circuit based on one or more such default declarative-based quantum configurations that can be specific to the chemistry domain, the AI domain, the CO domain, the SO domain, the finance domain, and/or another domain. For instance, one or more of such default declarative-based quantum configurations can be employed based on the type of computational specification and/or configuration to be solved by the quantum computation system 102.

In several embodiments, quantum computation system 102 and/or input transformation component 112 can receive the information required to generate one or more declarative-based quantum configurations via one or more types of user interfaces. For example, quantum computation system 102 and/or input transformation component 112 can be operatively coupled to various computer hardware and/or software components, such as input devices (e.g., mouse, keyboard, etc.), output devices (e.g., display monitor, etc.), an operating system, and/or one or more software applications adapted for inputting the information required to generate one or more declarative-based quantum configurations. For instance, quantum computation system 102 and/or input transformation component 112 can receive the information required to generate one or more declarative-based quantum configurations via one or more types of user interfaces described above with reference to driver component 108 (e.g., command line with automatic input validation, GUI with automatic input generation and validation, a documentation GUI, etc.). In several embodiments, an entity (e.g., a human) can employ one of such user interfaces to input information required to generate one or more declarative-based quantum configurations. For instance, such an entity can input one or more quantum algorithms, quantum algorithm subcomponents, quantum parameters, qubit entanglement parameters, and/or other information required to generate and/or execute a quantum circuit.

In some embodiments, circuit generator component 114 can generate a quantum circuit comprising a quantum circuit representation indicative of a machine-executable component. For example, circuit generator component 114 can generate a quantum circuit comprising a quantum circuit representation indicative of a machine-executable component that can be executed by one or more quantum computing devices (e.g., quantum computer, a quantum machine, a quantum processor, a quantum simulator, a quantum hardware, etc.).

According to numerous embodiments, quantum computation system 102, and/or components associated therewith (e.g., driver component 108, domain-specific input data 110, input transformation component 112, circuit generator component 114, etc.), can be configured and/or extended by an entity (e.g., a human). For instance, quantum computation system 102 and/or components associated therewith can comprise one or more user interfaces described above that enable an entity to input (e.g., plug-in) one or more new component implementations to quantum computation system 102, and/or components associated therewith.

In some embodiments, an entity can input (e.g., via a user interface as described above) new domain-specific input data (e.g., new computational specifications and/or configurations). In some embodiments, an entity can input new domain-specific driver components (e.g., new drivers). In some embodiments, an entity can input new input transformation components (e.g., new mathematical functions to generate domain-specific intermediate data). In some embodiments, an entity can input new circuit generator components (e.g., new quantum algorithms, new quantum algorithm subcomponents, quantum parameters, quantum entanglement parameters, etc.). In some embodiments, an entity can input new circuit optimization components that can optimize a quantum circuit generated by circuit generator component 114 (e.g., a new transpiler that can remove redundancies of a quantum circuit, such as, for example, redundancies 702 illustrated in FIG. 7F). In some embodiments, an entity can input new circuit execution components that can execute a quantum circuit generated by circuit generator component 114 (e.g., new quantum computer, new quantum hardware, new quantum processor, new quantum simulator, new quantum software, etc.). In some embodiments, an entity can input new configuration verification components (e.g., components that verify configuration-correctness of all data input to and/or output from any component of system 100 to ensure such data is compatible with components of system 100).

In some embodiments, quantum computation system 102 and/or components associated therewith, can comprise one or more application programming interface (API) components. For example, quantum computation system 102 and/or components associated therewith, can comprise an API component to facilitate configuring and/or extending quantum computation system 102 and/or components associated therewith. For instance, such API component can comprise a set of protocols, subroutine definitions, resources, and/or tools for inputting and/or building new component implementations to quantum computation system 102. In several embodiments, an entity can input and/or build a new implementation of a component to quantum computation system 102, and/or any components associated therewith, by inputting and/or building such new component implementation according to the programmatic framework of such an API component (e.g., according to the various protocols, subroutine definitions, resources, and/or tools of the API component). For example, an entity can perform such inputting and/or building of a new component implementation according to the API component to ensure the new component implementation is configured correctly and/or is compatible with all existing components of system 100, quantum computation system 102, and/or any components associated therewith.

In several embodiments, an entity can input a new implementation of a component to a file system component of system 100, quantum computation system 102, and/or any components associated therewith. For example, such file system component can comprise a database, a library, a memory storage component (e.g., memory 104), and/or another file system component. In some embodiments, an entity can input a new implementation of a component to a certain location of the file system component defined by, for instance, the API component described above. For example, an entity can input a new implementation of a component to a certain location of a database, a library, a memory storage component that can be defined by instructions in the API component described above.

In some embodiments, quantum computation system 102 can comprise a dynamic lookup component that can locate any new component implementations input to system 100, quantum computation system 102, and/or any component associated therewith, as described above. For example, such a dynamic lookup component can search (e.g., via a search algorithm and/or another search operation) the one or more locations of the file system component that have been specific by the API component for the new component implementation. In some embodiments, the dynamic lookup component can search such location(s) at run time (e.g., at execution of quantum computation system 102 and/or any components associated therewith).

In some embodiments, quantum computation system 102 can comprise a dynamic loading component that can load any new component implementations input to system 100, quantum computation system 102, and/or any component associated therewith, as described above. For example, such a dynamic loading component can facilitate such loading operation via a loader component that can execute read and/or write commands to write the new component implementations to a memory component (e.g., memory 104). In some embodiments, the dynamic loading component can load one or more new component implementations located by the dynamic lookup component as described above. For example, the dynamic loading component can load one or more new component implementations located by the dynamic lookup component at run time (e.g., at execution of quantum computation system 102 and/or any components associated therewith).

In several embodiments, quantum computation system 102 can comprise a register component that can facilitate registering one or more new component implementations input to system 100, quantum computation system 102, and/or any component associated therewith, as described above. For example, register component can comprise various registers including, but not limited to, index register, shift register, flip flops, and/or another register that can facilitate registering new component implementations with quantum computation system 102 (e.g., registering new implementations at a location on, for instance, memory 104 and/or processor 106). For instance, register component can facilitate registering new component implementations such that the new component implementations can be utilized by: quantum computation system 102; components associated with quantum computation system 102; and/or an entity (e.g., a human user of system 100 and/or quantum computation system 102). In some embodiments, register component can facilitate registering new component implementations that have been located by dynamic lookup component described above. For example, register component can facilitate registering new component implementations located by dynamic lookup component at run time as described above. In several embodiments, register component can facilitate new component implementations registering themselves with quantum computation system 102. For example, such components can register themselves with memory 104 and/or processor 106. In some embodiments, register component can facilitate new component implementations registering themselves with one another. For example, an existing quantum algorithm can register itself with a new implementation of a component input to system 100, quantum computation system 102, and/or any components associated therewith.

In numerous embodiments, it should be appreciated that the functionality described above to input one or more new implementations of a component allows for extensibility and/or customization of system 100, quantum computation system 102, and/or any components associated therewith. For example, the components described above (e.g., API components, dynamic lookup component, dynamic loading component, etc.) that can facilitate inputting new implementations of a component to quantum computation system 102, and/or any components associated therewith enable quantum computation system 102 to be extended to one or more domains not described in this disclosure. In another example, the components described above that can facilitate inputting new implementations of a component to quantum computation system 102, and/or any components associated therewith enable quantum computation system 102 to generate solutions for domain-specific problems (e.g., computational specifications and/or configurations) not described in this disclosure.

Figure 2:
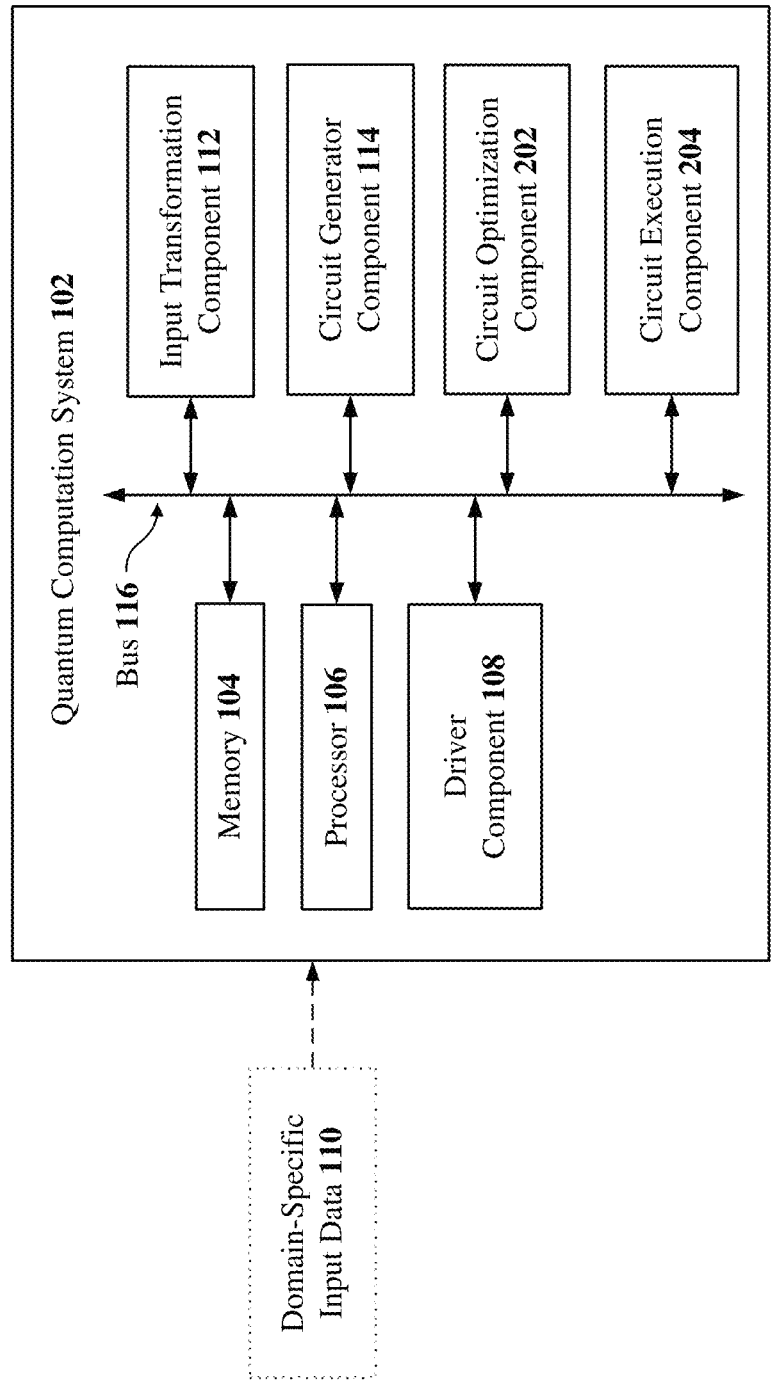
FIG. 2 illustrates a block diagram of an example, non-limiting system that facilitates quantum domain computation of classical domain specifications components in accordance with one or more embodiments described herein.

FIG. 2 illustrates a block diagram of an example, non-limiting system 200 that facilitates quantum domain computation of classical domain specifications components in accordance with one or more embodiments described herein. In FIG. 2, one or more components are depicted with dashed lines to indicate that, according to some embodiments, such components represent various input and/or output data that can be transferred, received, generated, and/or manipulated by one or more components of system 200. Repetitive description of like elements employed in respective embodiments is omitted for sake of brevity. According to several embodiments, system 200 can comprise quantum computation system 102. In some embodiments, quantum computation system 102 can comprise a circuit optimization component 202 and/or a circuit execution component 204.

According to several embodiments, circuit optimization component 202 can remove one or more redundancies of a quantum circuit. For example, circuit optimization component 202 can remove one or more redundancies of a quantum circuit generated by circuit generator component 114 as described above. In some embodiments, circuit optimization component 202 can remove one or more consecutive identical quantum logic gates of a quantum circuit model of computation. For example, circuit optimization component 202 can remove (e.g., via a source-to-source compiler, a transcompiler, a transpiler, etc.) one or more consecutive identical controlled-Z gates (CZ gates) in a representation of a quantum circuit (e.g., a quantum circuit representation indicative of a machine-executable component).

According to several embodiments, circuit execution component 204 can execute a quantum circuit. For example, circuit execution component 204 can execute a quantum circuit generated by circuit generator component 114 as described above. In some embodiments, circuit execution component 204 can execute a quantum circuit to generate a result to a domain-specific computational specification and/or configuration received by quantum computation system 102. For example, in the chemistry domain, circuit execution component 204 can execute a quantum circuit generated by circuit generator component 114 to generate a result to a chemistry-specific problem received by quantum computation system 102, such as, for example, a molecule configuration, a molecular ground-state energy, a basis-set (e.g., Slater-type orbital (STO), such as a STO-3G), dipole moment, excited states, total angular momentum, and/or another chemistry-specific computational specification and/or configuration. In some embodiments, circuit execution component 204 can comprise a quantum device. For example, circuit execution component 204 can comprise a quantum computer, a quantum machine, a quantum processor, a quantum simulator, quantum hardware, quantum software, and/or another quantum device.

Figure 3:
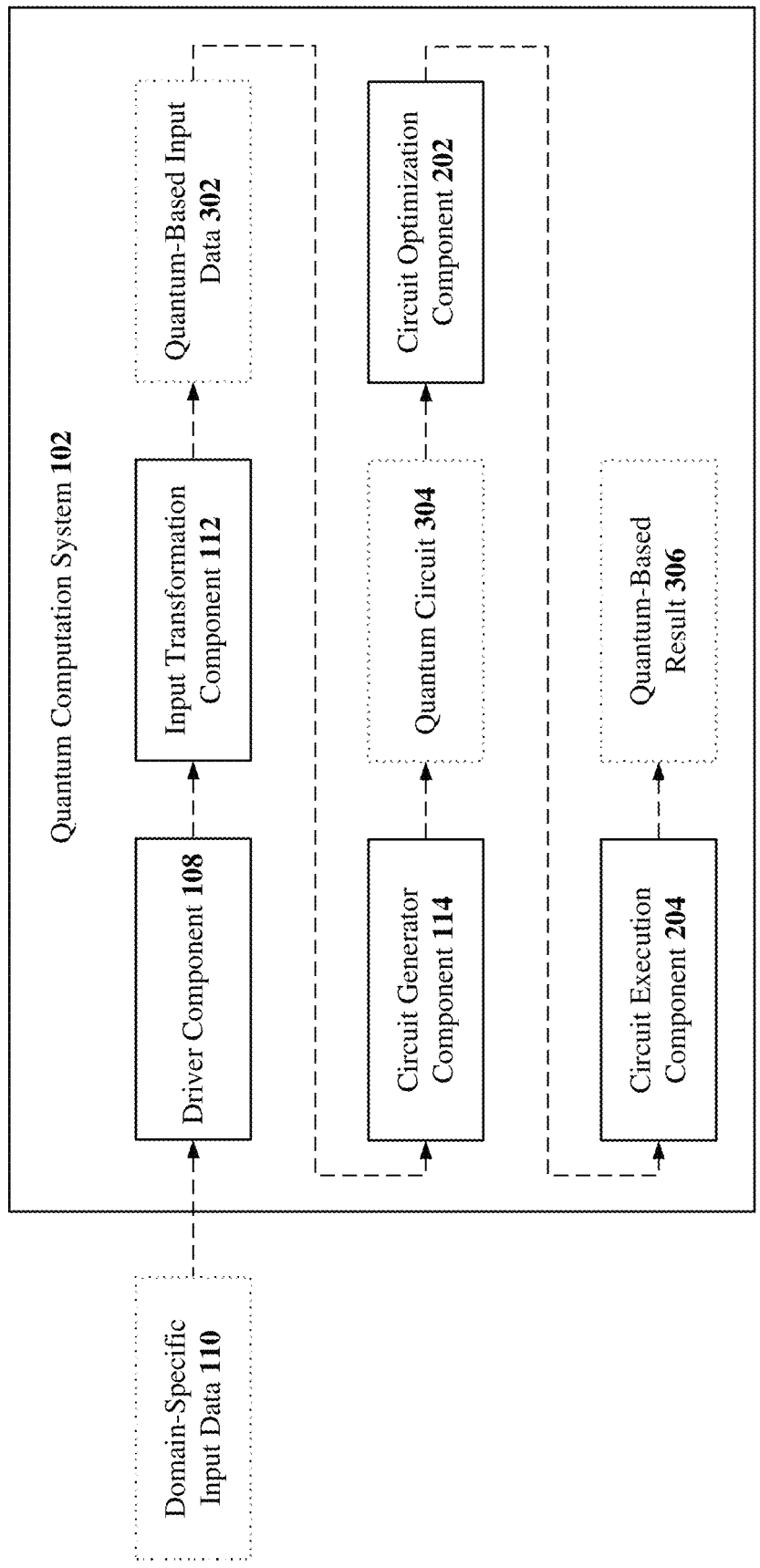
FIG. 3 illustrates a block diagram of an example, non-limiting system that facilitates quantum domain computation of classical domain specifications components in accordance with one or more embodiments described herein.

FIG. 3 illustrates a block diagram of an example, non-limiting system 300 that facilitates quantum domain computation of classical domain specifications components in accordance with one or more embodiments described herein. For purposes of brevity and clarity, FIG. 3 illustrates an embodiment of the quantum computation system 102 comprising only the components required to describe system 300 and/or quantum computation system 102. Although FIG. 3 does not depict some components described above with reference to FIG. 1 and FIG. 2 (e.g., memory 104, processor 106, bus 116, etc.), it should be appreciated that the embodiment shown in FIG. 3 is for illustration only, and as such, the system 300 is not so limited. Repetitive description of like elements employed in respective embodiments is omitted for sake of brevity. According to several embodiments, system 300 can comprise quantum computation system 102. In some embodiments, quantum computation system 102 can comprise quantum-based input data 302, quantum circuit 304, and/or quantum-based result 306.

In FIG. 3, one or more components are depicted with dashed lines to indicate that, according to some embodiments, such components represent various input and/or output data that can be transferred, received, generated, and/or manipulated by one or more components of system 300. FIG. 3 depicts an example embodiment illustrating how such input and/or output data can be transferred, received, generated, and/or manipulated by one or more components of system 300 in accordance with one or more embodiments described herein.

In multiple embodiments, quantum computation system 102 can receive domain-specific input data 110 (e.g., via driver component 108, as described above with reference to FIG. 1 and driver component 108). In some embodiments, driver component 108 can generate domain-specific intermediate data and one or more domain-specific operators based on such domain-specific input data 110 (e.g., as described above with reference to FIG. 1 and driver component 108).

In some embodiments, driver component 108 can directly input (e.g., via bus 116) such one or more domain-specific operators generated by driver component 108 to input transformation component 112. In some embodiments, input transformation component 112 can transform such domain-specific operators to quantum-based input data 302, based on such domain-specific operators (e.g., as described above with reference to FIG. 1 and input transformation component 112).

In some embodiments, input transformation component 112 can directly input (e.g., via bus 116) such quantum-based input data 302 generated by input transformation component 112 to circuit generator component 114. In some embodiments, circuit generator component 114 can generate a quantum circuit 304, based on such quantum-based input data 302 (e.g., as described above with reference to FIG. 1 and circuit generator component 114).

In some embodiments, circuit generator component 114 can directly input (e.g., via bus 116) such quantum circuit 304 to circuit optimization component 202. In some embodiments, circuit optimization component 202 can remove one or more redundancies of quantum circuit 304 (e.g., as described above with reference to FIG. 2 and circuit optimization component 202). In some embodiments, circuit optimization component 202 can directly input (e.g., via bus 116) such optimized quantum circuit 304 to circuit execution component 204. In some embodiments, circuit execution component 204 can generate quantum-based result 306 (e.g., as described above with reference to FIG. 2 and circuit execution component 204).

Figure 4:
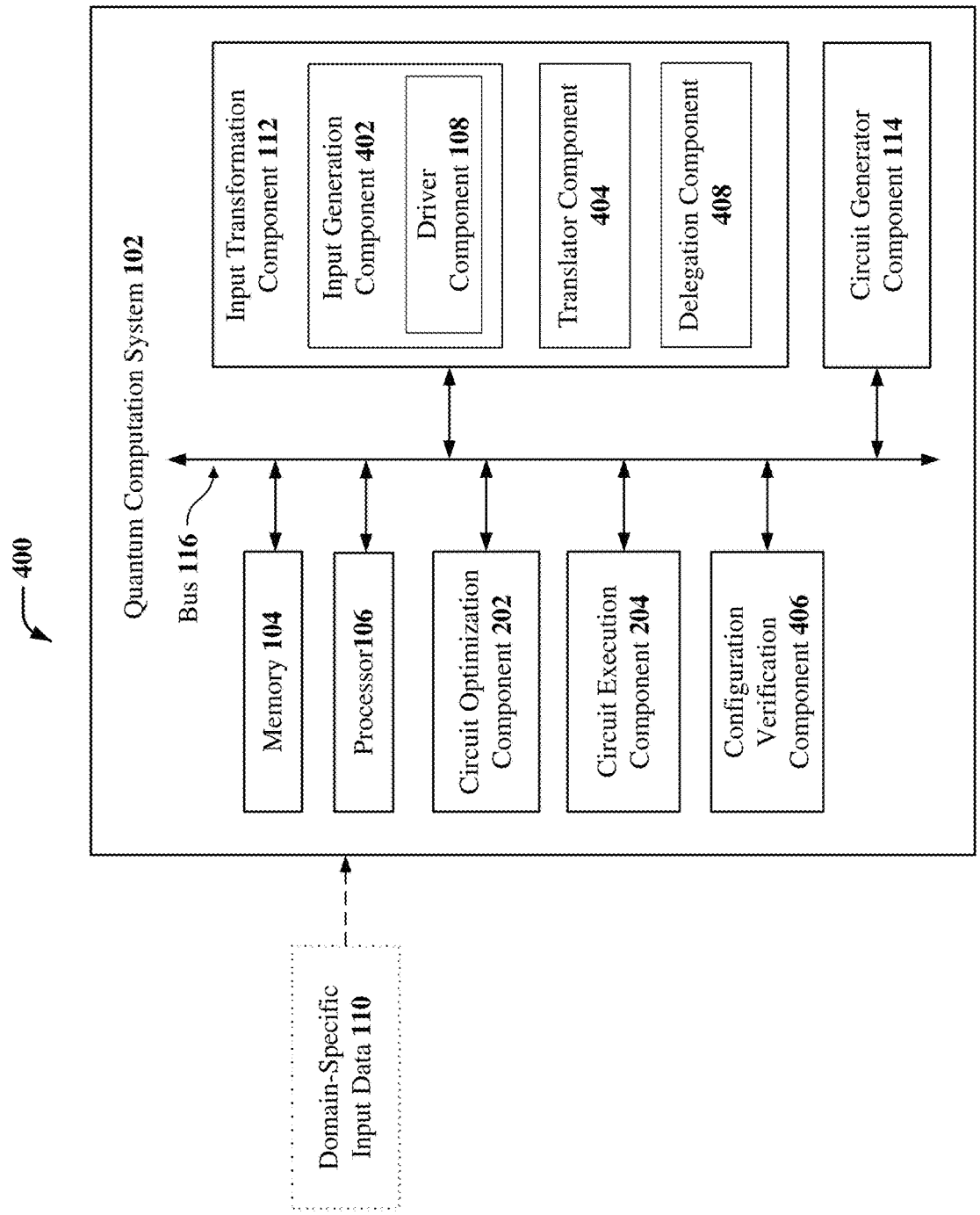
FIG. 4 illustrates a block diagram of an example, non-limiting system that facilitates quantum domain computation of classical domain specifications components in accordance with one or more embodiments described herein.

FIG. 4 illustrates a block diagram of an example, non-limiting system 400 that facilitates quantum domain computation of classical domain specifications components in accordance with one or more embodiments described herein. In FIG. 4, one or more components are depicted with dashed lines to indicate that, according to some embodiments, such components represent various input and/or output data that can be transferred, received, generated, and/or manipulated by one or more components of system 400. Repetitive description of like elements employed in respective embodiments is omitted for sake of brevity.

According to several embodiments, system 400 can comprise quantum computation system 102. In numerous embodiments, quantum computation system 102 can comprise input transformation component 112 and/or a configuration verification component 406. In some embodiments, input transformation component 112 can comprise an input generation component 402, a translator component 404, and/or a delegation component 408. In some embodiments, input generation component 402 can comprise driver component 108.

In multiple embodiments, to facilitate transformation of domain-specific input data 110 to quantum-based input data (e.g., a domain-specific operator), input transformation component 112 can employ input generation component 402. In some embodiments, input generation component 402 can generate a domain-specific operator based on domain-specific input data 110. For example, input generation component 402 can comprise one or more driver components 108 that can generate domain-specific intermediate data formatted in such a manner that it can be translated to a domain-specific operator.

In some embodiments, to facilitate generating a domain-specific operator, input generation component 402 and/or driver component 108 can comprise one or more mathematical functions that, when executed using domain-specific input data 110 as inputs, can generate domain-specific intermediate data that can be represented by one or more domain-specific operators. For example, in the chemistry domain, input generation component 402 and/or driver component 108 can comprise certain mathematical functions that can receive a molecule configuration and generate domain-specific intermediate data including, but not limited to, one-body integrals and two-body integrals of the Hamiltonian for the molecule, dipole integrals, molecular orbital coefficients and energies, HartreeFock energy, nuclear repulsion energy, and/or other domain-specific intermediate data. For instance, input generation component 402 and/or driver component 108 can comprise mathematical functions, such as, for example, second quantization, Bogoliubov transformation, and/or other mathematical functions. In this example, input generation component 402 and/or driver component 108 can employ such mathematical functions to generate one or more fermionic Hamiltonians (i.e. domain-specific operators), which can be translated to a qubit operator.

In multiple embodiments, to facilitate translation of a domain-specific operator to a qubit operator, input transformation component 112 can employ translator component 404. In some embodiments, translator component 404 can translate domain-specific operators to one or more quantum-based operators, such as, for example, one or more qubit operators, thereby completing the transformation of domain-specific input data 110 to a qubit operator. For example, translator component 404 can translate a domain-specific operator to a qubit operator by executing one or more mapping operations including, but not limited to, Jordan-Wigner mapping, Bravyi-Kitaev mapping, binary-tree mapping, parity mapping, and/or another mapping operation. For instance, in the chemistry domain example described above, translator component 404 can translate a Hamiltonian operator (e.g., a fermionic Hamiltonian operator) to a qubit Hamiltonian operator via binary-tree mapping and/or parity mapping.

In several embodiments, the one or more quantum-based operators output from translator component 404, as described above, can be indicative of domain-independent and/or driver-independent input data that can be input to circuit generator component 114. For example, one or more qubit operators output from input transformation component 112 can be indicative of domain-independent and/or driver-independent input data that can be input to circuit generator component 114.

According to numerous embodiments, circuit generator component 114 can generate a quantum circuit based on quantum-based input data. For example, circuit generator component 114 can generate a quantum circuit based on a qubit operator (e.g., a Hamiltonian operator) output from translator component 404 as described above.

In some embodiments, to facilitate generating a quantum circuit based on a qubit operator, circuit generator component 114 can comprise one or more quantum algorithms that circuit generator component 114 can employ to generate such a quantum circuit. In some embodiments, such quantum algorithms can be domain-specific quantum algorithms. In some embodiments, such quantum algorithms can be domain-independent quantum algorithms In an embodiment for the chemistry domain, circuit generator component 114 can comprise quantum algorithms including, but not limited to, Variational Quantum Eigensolver (VQE) algorithm, (VQKE), (QPE), (IQPE), Dynamics, and/or another quantum algorithm. In an embodiment for the AI domain, circuit generator component 114 can comprise quantum algorithms including, but not limited to, approximate quantum Fourier transform, support vector machine, Gaussian processes, k-eigenvalue decomposition, and/or another quantum algorithm. In an embodiment for the CO domain, circuit generator component 114 can comprise quantum algorithms including, but not limited to, Grover, VQE, and/or another quantum algorithm. In an embodiment for the SO domain, circuit generator component 114 can comprise quantum algorithms including, but not limited to, VQE, QPE, adiabatic algorithm, and/or another quantum algorithm. In an embodiment for the finance domain, circuit generator component 114 can comprise quantum algorithms including, but not limited to, VQE, QPE, adiabatic algorithm, and/or another quantum algorithm.

In some embodiments, circuit generator component 114 can comprise one or more quantum algorithm subcomponents that circuit generator component 114 can employ to generate a quantum circuit. For example, circuit generator component 114 can comprise and employ one or more quantum algorithm subcomponents including, but not limited to, local and/or global optimizers, variational forms, initial states, and/or another algorithm subcomponent.

According to multiple embodiments, configuration verification component 406 can verify correctness of domain-specific input data 110, quantum-based input data 302, and/or other data that can be input to or output from any components of quantum computation system 102. For example, configuration verification component 406 can read domain-specific input data 110 that can be input to driver component 108 as a computational specification and/or configuration to be solved by quantum computation system 102. For instance, configuration verification component 406 can read such input data to verify it provides the information required for one or more components of quantum computation system 102 (e.g., driver component 108, input transformation component 112, etc.) to execute the respective functions of such components.

In some embodiments, configuration verification component 406 can read domain-specific input data 110 to verify such data is correctly configured for the domain-specific driver component 108 to which the data is input (e.g., a chemistry-specific driver component 108, an AI-specific driver component 108, a CO-specific driver component 108, etc.). For instance, configuration verification component 406 can read a chemistry-specific computational specification and/or configuration to verify it is correctly configured to be input and/or executed by a chemistry-specific driver component 108. For example, configuration verification component 406 can read a chemistry-specific computational specification and/or configuration to verify it is a problem that can be input to a chemistry-specific driver component 108 (e.g., as opposed to an AI-specific driver component 108, for example) and/or solved by quantum computation system 102 utilizing a chemistry-specific driver component 108. In another example, configuration verification component 406 can read a chemistry-specific computational specification and/or configuration to verify it defines the correct parameters and/or parameter ranges a chemistry-specific driver component 108 requires.

In multiple embodiments, configuration verification component 406 can read quantum-based input data 302 that can be input to circuit generator component 114 to verify it provides the information required for circuit generator component 114 to generate quantum circuit 304. For example, configuration verification component 406 can read quantum-based input data 302 (e.g., a qubit operator and/or a quantum configuration) to verify such data specifies the correct quantum algorithm, the correct quantum algorithm subcomponent, the correct quantum parameter, and/or other quantum-based input data 302 required by circuit generator component 114 to generate quantum circuit 304.

In some embodiments, configuration verification component 406 can verify correctness of domain-specific input data 110, quantum-based input data 302, and/or other input data at the time such data is input to quantum computation system 102 and/or any components associated therewith (e.g., driver component 108, input transformation component 112, circuit generator component 114, etc.). For example, configuration verification component 406 can verify correctness of domain-specific input data 110 at the time an entity inputs such data to a user interface of quantum computation system 102 and/or driver component 108. In another example, configuration verification component 406 can verify correctness of quantum-based input data 302 at the time input transformation component 112 inputs such data to circuit generator component 114.

In some embodiments, configuration verification component 406 can be activated programmatically. For instance, configuration verification component 406 can read domain-specific input data 110, quantum-based input data 302, quantum circuit 304, and/or other input data, to verify such data is correctly configured at run time (e.g., at execution of quantum computation system 102 and/or any components associated therewith).

In several embodiments, configuration verification component 406 can reject incorrect domain-specific input data 110, incorrect quantum-based input data 302, and/or other incorrect data that can be input to or output from any components of quantum computation system 102. For example, configuration verification component 406 can reject incorrect domain-specific input data 110 at the time an entity inputs such data to a user interface of quantum computation system 102 and/or driver component 108 by preventing configuration of driver component 108 based on such incorrect data. In another example, configuration verification component 406 can reject incorrect quantum-based input data 302 at the time input transformation component 112 outputs quantum-based input data 302 by preventing configuration of circuit generator component 114 based on such incorrect data. In still another example, configuration verification component 406 can reject incorrect quantum-based input data 302 at the time input transformation component 112 attempts to input such data to circuit generator component 114 by preventing configuration of circuit generator component 114 based on such incorrect data.

According to multiple embodiments, delegation component 408 can delegate one or more computational operations to a driver component or a quantum device. In some embodiments, delegation component 408 can delegate solution of one or more portions of domain-specific input data 110 by classical computation. For instance, delegation component 408 can read domain-specific input data 110 to determine whether such data, and/or one or more portions thereof, is computationally inexpensive (e.g., problems having low-level complexity) or computationally expensive (e.g., problems having high-level complexity). In this example, based on whether such data, and/or portions thereof, is computationally inexpensive or computationally expensive, delegation component 408 can further delegate solution of domain-specific input data 110 by classical computation components of quantum computation system 102 and/or by hybrid (e.g., classical and quantum-based) components of quantum computation system 102.

In some embodiments, delegation component 408 can delegate solution of computationally inexpensive domain-specific input data 110, and/or portions thereof, by classical computational operations (e.g., via driver component 108 and/or processor 106). For example, delegation component 408 can delegate solution of computationally inexpensive domain-specific input data 110, and/or portions thereof, to driver component 108. In this example, driver component 108 can employ classical domain-specific computation operations (e.g., mathematical functions, algorithms, etc., as described above with reference to FIG. 1, FIG. 4, and driver component 108) to generate one or more classical-based results 508.

In some embodiments, delegation component 408 can delegate solution of computationally expensive domain-specific input data 110, and/or portions thereof, by hybrid (e.g., classical and quantum-based) computational operations. For example, delegation component 408 can delegate solution of computationally expensive domain-specific input data 110, and/or portions thereof, to the various hybrid computation components of quantum computation system 102 to generate quantum-based result 306. For example, delegation component 408 can delegate solution of computationally expensive domain-specific input data 110, and/or portions thereof, to driver component 108, translator component 404, circuit generator component 114, circuit optimization component 202, and/or circuit execution component 204, as described above, to generate quantum-based result 306.

In some embodiments, quantum computation system 102 can be a quantum domain computation of classical domain specifications system and/or process associated with various technologies. For example, quantum computation system 102 can be associated with classical domain computation technologies, classical domain-specific computation technologies, quantum mechanics technologies, quantum domain computation technologies, quantum computer technologies, quantum hardware and/or software technologies, quantum simulator technologies, classical domain and/or quantum domain data collection technologies, classical domain and/or quantum domain data processing technologies, classical domain and/or quantum domain data analysis technologies, machine learning technologies, artificial intelligence technologies, and/or other technologies.

In some embodiments, quantum computation system 102 can employ hardware and/or software to solve problems that are highly technical in nature, that are not abstract and that cannot be performed as a set of mental acts by a human. For example, quantum computation system 102 can automatically: transform domain-specific input data to quantum-based input data; and generate a quantum circuit based on the quantum-based input data. In such an example, quantum computation system 102 can also automatically execute the quantum circuit (e.g., via a quantum device, such as, for example, a quantum computer, quantum simulator, quantum hardware, etc.).

It is to be appreciated that quantum computation system 102 can perform a quantum domain computation of classical domain specifications process utilizing various combinations of electrical components, mechanical components, and circuitry that cannot be replicated in the mind of a human or performed by a human. For example, transforming classical domain input data to quantum domain input data, generating a quantum circuit based on the quantum domain input data, and/or executing the quantum circuit are operations that are greater than the capability of a human mind. For instance, the amount of data processed, the speed of processing such data, and/or the types of data processed by quantum computation system 102 over a certain period of time can be greater, faster, and/or different than the amount, speed, and/or data type that can be processed by a human mind over the same period of time.

According to several embodiments, quantum computation system 102 can also be fully operational towards performing one or more other functions (e.g., fully powered on, fully executed, etc.) while also performing the above-referenced quantum domain computation of classical domain specifications process. It should be appreciated that such simultaneous multi-operational execution is beyond the capability of a human mind. It should also be appreciated that quantum computation system 102 can include information that is impossible to obtain manually by an entity, such as a human user. For example, the type, amount, and/or variety of information included in driver component 108, domain-specific input data 110, input transformation component 112, circuit generator component 114, and/or circuit execution component 118, can be more complex than information obtained manually by a human user.

In some embodiments, quantum computation system 102 can provide technical improvements to classical domain computation systems, classical domain-specific computation systems, quantum domain computation systems, quantum computer systems, quantum hardware and/or software systems, quantum simulator systems, classical domain and/or quantum domain data collection systems, classical domain and/or quantum domain data processing systems, classical domain and/or quantum domain data analysis systems, artificial intelligence systems, and/or other systems. For example, quantum computation system 102 can automatically transform classical domain input data to quantum domain input data, generate a quantum circuit based on the quantum domain input data, and/or execute the quantum circuit, thereby facilitating computation of classical domain problems utilizing quantum domain infrastructure (e.g., quantum domain hardware and/or software employing quantum-mechanics phenomena). Further, quantum computation system 102 can facilitate such transformation, circuit generation, and/or quantum circuit execution operations described above based on one or more types of classical domain-specific input data can correspond to at least one of a plurality of domains (e.g., chemistry domain, AI domain, CO domain, SO Domain, and/or Finance Domain), thereby facilitating computation of various classical domain-specific problems utilizing quantum domain infrastructure.

In some embodiments, quantum computation system 102 can provide technical improvements to a processing unit associated therewith, such as, for example, processor 106, by improving processing capacity, processing accuracy, processing performance, processing efficiency, and/or processing time of processor 106. For instance, quantum computation system 102 can facilitate execution of the quantum circuit described above by employing a quantum device rather than processor 106, thereby facilitating improved processing capacity and/or processing performance associated with processor 106. For example, by executing the quantum circuit via circuit execution component 204 rather than processor 106, the processing workload of processor 106 is thereby reduced, which improves the processing capacity of processor 106 by enabling processor 106 to execute other processing workloads (e.g., processing workloads that are different from the execution of the quantum circuit). Additionally, quantum computation system 102 can facilitate configuration-correctness verification by ensuring all classical domain input data and/or quantum domain input data are configured correctly and compatible with components of quantum computation system 102, thereby facilitating improved processing accuracy, processing efficiency, and/or processing time associated with processor 106. For example, completing such verification prevents processing of incorrect data by processor 106, thereby ensuring processor 106 only processes accurate data, which enables processor 106 to: produce accurate processing results; reduce the number of processing cycles needed to produce such accurate processing results; and/or reduce processing time required to process such data.

Figure 5:
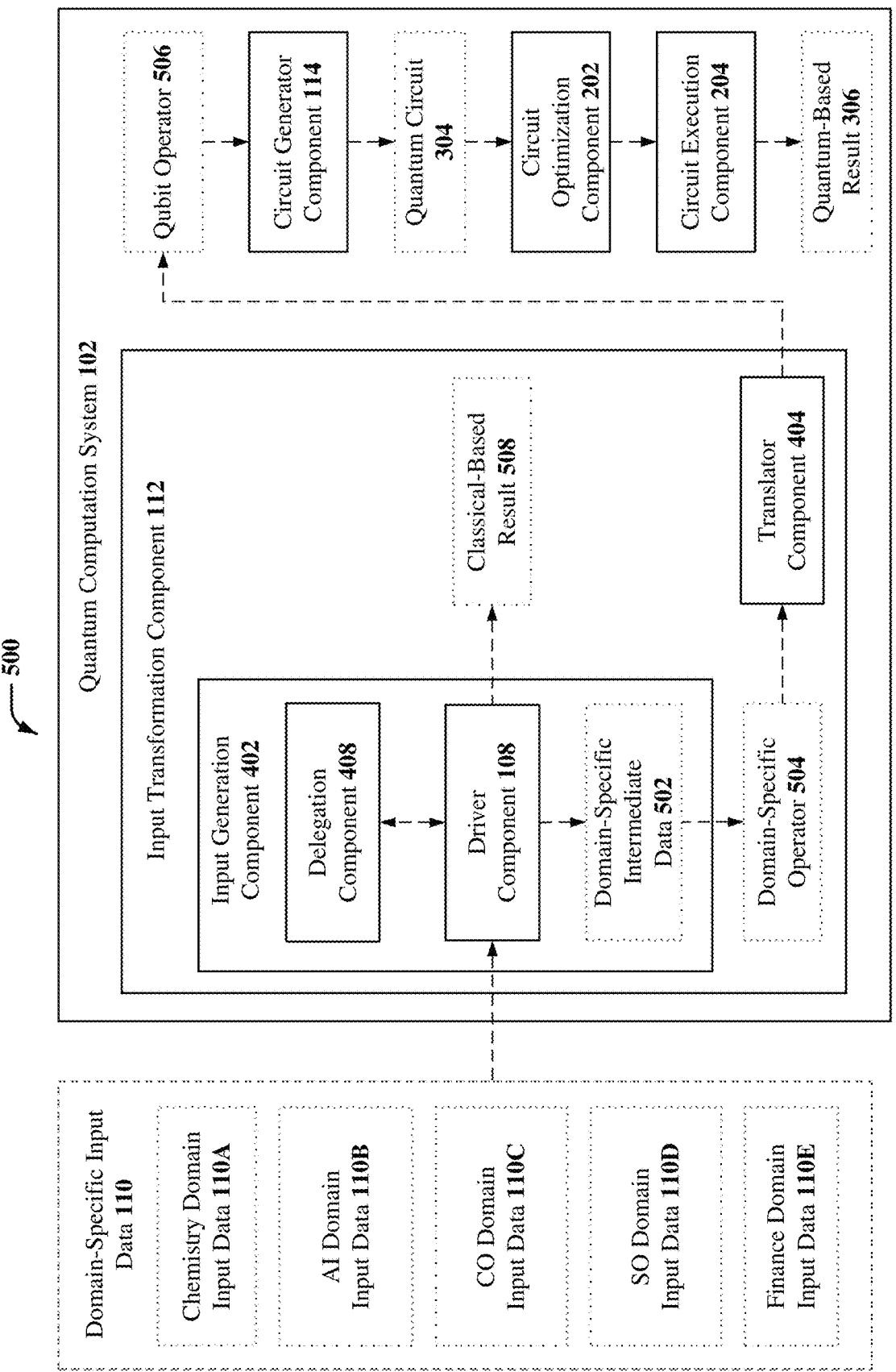
FIG. 5 illustrates a block diagram of an example, non-limiting system that facilitates quantum domain computation of classical domain specifications components in accordance with one or more embodiments described herein.

FIG. 5 illustrates a block diagram of an example, non-limiting system 500 that facilitates quantum domain computation of classical domain specifications components in accordance with one or more embodiments described herein. For purposes of brevity and clarity, FIG. 5 illustrates an embodiment of the quantum computation system 102 comprising only the components required to describe system 500 and/or quantum computation system 102. Although FIG. 5 does not depict some components described above with reference to FIG. 1, FIG. 2, and FIG. 4 (e.g., memory 104, processor 106, bus 116, etc.), it should be appreciated that the embodiment shown in FIG. 5 is for illustration only, and as such, the system 500 is not so limited. Repetitive description of like elements employed in respective embodiments is omitted for sake of brevity. According to several embodiments, system 500 can comprise quantum computation system 102. In some embodiments, quantum computation system 102 can comprise domain-specific intermediate data 502, domain-specific operator 504, and/or qubit operator 506. In some embodiments, quantum computation system 102 can be adapted to receive domain-specific input data 110 including, but not limited to, chemistry domain input data 110A, artificial intelligence (AI) domain input data 110B, combinatorial optimization (CO) domain input data 110C, stochastic optimization (SO) domain input data 110D, and/or finance domain input data 110E.

In FIG. 5, one or more components are depicted with dashed lines to indicate that, according to some embodiments, such components represent various input and/or output data that can be transferred, received, generated, and/or manipulated by one or more components of system 500. FIG. 5 depicts an example embodiment illustrating how such input and/or output data can be transferred, received, generated, and/or manipulated by one or more components of system 500 in accordance with one or more embodiments described herein.

In multiple embodiments, quantum computation system 102, input transformation component 112, and/or input generation component 402 can receive chemistry domain input data 110A, AI domain input data 110B, CO domain input data 110C, SO domain input data 110D, and/or finance domain input data 110E via driver component 108 (e.g., as described above with reference to FIG. 1 and driver component 108). In some embodiments, driver component 108 and/or input generation component 402 can generate domain-specific intermediate data 502 and one or more domain-specific operators 504 based on such chemistry domain input data 110A, AI domain input data 110B, CO domain input data 110C, SO domain input data 110D, and/or finance domain input data 110E (e.g., as described above with reference to FIG. 1, FIG. 4, driver component 108, and input generation component 402).

In some embodiments, driver component 108 and/or input generation component 402 can directly input (e.g., via bus 116) such one or more domain-specific operators 504 generated by driver component 108 and/or input generation component 402 to translator component 404. In some embodiments, translator component 404 can translate such domain-specific operator(s) 504 to one or more qubit operators 506, based on such domain-specific operator(s) 504 (e.g., as described above with reference to FIG. 4 and translator component 404).

In some embodiments, input transformation component 112 and/or translator component 404 can directly input (e.g., via bus 116) such qubit operator(s) 506 output from translator component 404 to circuit generator component 114. In some embodiments, circuit generator component 114 can generate a quantum circuit 304, based on such qubit operator(s) 506 (e.g., as described above with reference to FIG. 1, FIG. 4, and circuit generator component 114).

In some embodiments, circuit generator component 114 can directly input (e.g., via bus 116) such quantum circuit 304 to circuit optimization component 202. In some embodiments, circuit optimization component 202 can remove one or more redundancies of quantum circuit 304 (e.g., as described above with reference to FIG. 2 and circuit optimization component 202). In some embodiments, circuit optimization component 202 can directly input (e.g., via bus 116) such optimized quantum circuit 304 to circuit execution component 204. In some embodiments, circuit execution component 204 can generate quantum-based result 306 (e.g., as described above with reference to FIG. 2 and circuit execution component 204).

Figure 6:
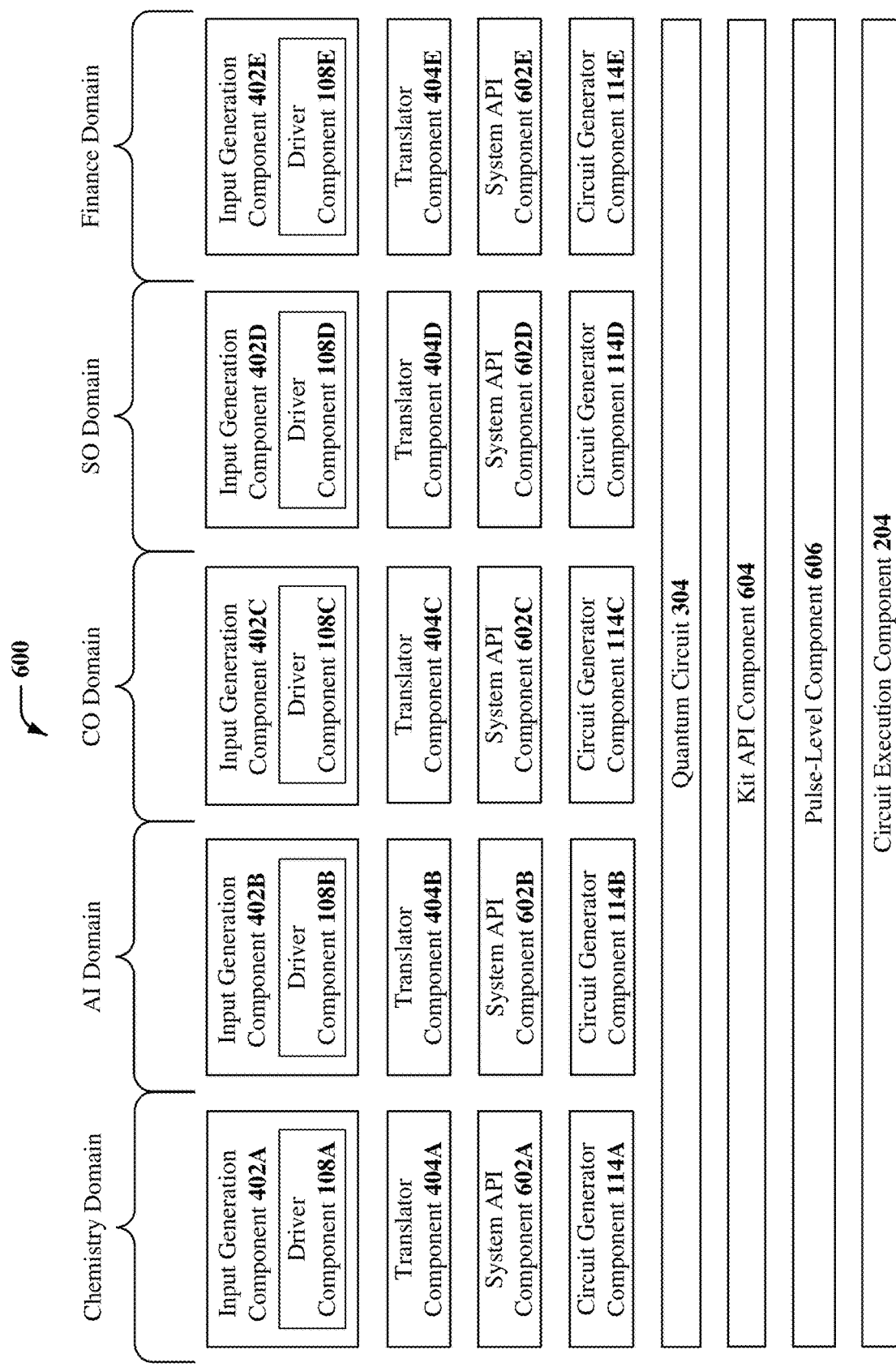
FIG. 6 illustrates a block diagram of an example, non-limiting system that facilitates quantum domain computation of classical domain specifications components in accordance with one or more embodiments described herein.

FIG. 6 illustrates a block diagram of an example, non-limiting system 600 that facilitates quantum domain computation of classical domain specifications components in accordance with one or more embodiments described herein. Repetitive description of like elements employed in respective embodiments is omitted for sake of brevity. In one or more embodiments, system 600 can be a subsystem of system 100, system 200, system 300, system 400, and/or system 500, and vice versa (e.g., system 600 can include system 100, system 200, system 300, system 400, and/or system 500, and vice versa).

According to numerous embodiments, system 600 can comprise one or more input generation components 402, one or more driver components 108, one or more translator components 404, one or more system API components 602, and/or one or more circuit generator components 114. In some embodiments, such components can correspond to respective domains. According to the embodiment illustrated in FIG. 6, components corresponding to respective domains are designated with a certain suffix indicating the domain to which they correspond. Specifically, components depicted with an "A" suffix in FIG. 6 correspond to the chemistry domain; components depicted with a "B" suffix correspond to the AI domain; components depicted with a "C" suffix correspond to the CO domain; components depicted with a "D" suffix correspond to the SO domain; and components depicted with an "E" suffix correspond to the finance domain. In several embodiments, system 600 can further comprise kit API component 604 and/or pulse-level component 606.

In multiple embodiments, one or more input generation components 402A, 402B, 402C, 402D, 402E and/or driver components 108A, 108B, 108C, 108D, 108E can receive respective domain-specific input data 110 corresponding to their respective domains (e.g., as described above with reference to FIG. 1, FIG. 4, driver component 108, and input generation component 402). In some embodiments, driver components 108A, 108B, 108C, 108D, 108E and/or input generation components 402A, 402B, 402C, 402D, 402E can generate respective domain-specific intermediate data (e.g., domain-specific intermediate data 502 and/or one or more respective domain-specific operators 504) based on such respective domain-specific input data 110 (e.g., as described above with reference to FIG. 1, FIG. 4, driver component 108, and input generation component 402).

In some embodiments, driver components 108A, 108B, 108C, 108D, 108E and/or input generation components 402A, 402B, 402C, 402D, 402E can directly input (e.g., via bus 116) respective domain-specific intermediate data, such as, for example, one or more respective domain-specific operators 504 generated by driver components 108A, 108B, 108C, 108D, 108E and/or input generation components 402A, 402B, 402C, 402D, 402E to translator components 404A, 404B, 404C, 404D, 404E. In some embodiments, translator components 404A, 404B, 404C, 404D, 404E can translate such respective domain-specific operator(s) 504 to one or more respective qubit operators 506, based on such respective domain-specific operator(s) 504 (e.g., as described above with reference to FIG. 4 and translator component 404).

In several embodiments, system API components 602A, 602B, 602C, 602D, 602E can comprise one or more respective configuration protocols, subroutine definitions, resources, and/or tools defining how to configure respective circuit generator components 114A, 114B, 114C, 114D, 114E to generate a domain-independent quantum circuit based on quantum-based input data, such as, for example, respective qubit operator(s) 506. In some embodiments, circuit generator components 114A, 114B, 114C, 114D, 114E can be configured based on respective system API components 602A, 602B, 602C, 602D, 602E. For example, circuit generator components 114A, 114B, 114C, 114D, 114E can be configured according to respective system API components 602A, 602B, 602C, 602D, 602E by specifying one or more domain-specific quantum algorithms, domain-specific quantum algorithm subcomponents, domain-specific quantum parameters, and/or another domain-specific parameter according to respective system API components 602A, 602B, 602C, 602D, 602E.

In several embodiments, circuit generator components 114A, 114B, 114C, 114D, 114E configured according to respective system API components 602A, 602B, 602C, 602D, 602E can generate (e.g., as described above with reference to FIG. 1, FIG. 4, and circuit generator component 114) a domain-independent quantum circuit 304, based on such respective qubit operator(s) 506. For example, circuit generator components 114A, 114B, 114C, 114D, 114E can be configured according to respective system API components 602A, 602B, 602C, 602D, 602E by utilizing one or more quantum configurations (e.g., as described above with reference to FIG. 1) to specify one or more domain-specific quantum parameters required to generate a quantum circuit according to respective system API components 602A, 602B, 602C, 602D, 602E (e.g., domain-specific quantum algorithm(s), domain-specific quantum algorithm subcomponent(s), etc.).

In some embodiments, kit API component 604 can comprise one or more protocols, subroutine definitions, resources, and/or tools defining how to optimize quantum circuit 304. In several embodiments, quantum circuit 304 can be optimized according to kit API component 604. For example, quantum circuit 304 can be optimized according to kit API component 604 by configuring circuit optimization component 202 to optimize quantum circuit 304 (e.g., as described above with reference to FIG. 2) according to kit API component 604.

According to several embodiments, pulse-level component 606 can design pulse-level entanglers. For example, pulse-level component 606 can design pulse-level entanglers more efficient than gate-level entangler. In some embodiments, pulse-level component 606 can perform Hamiltonian tomography. In such embodiments, pulse-level component 606 can further tailor the methods to the specific devices.

Figure 6A:
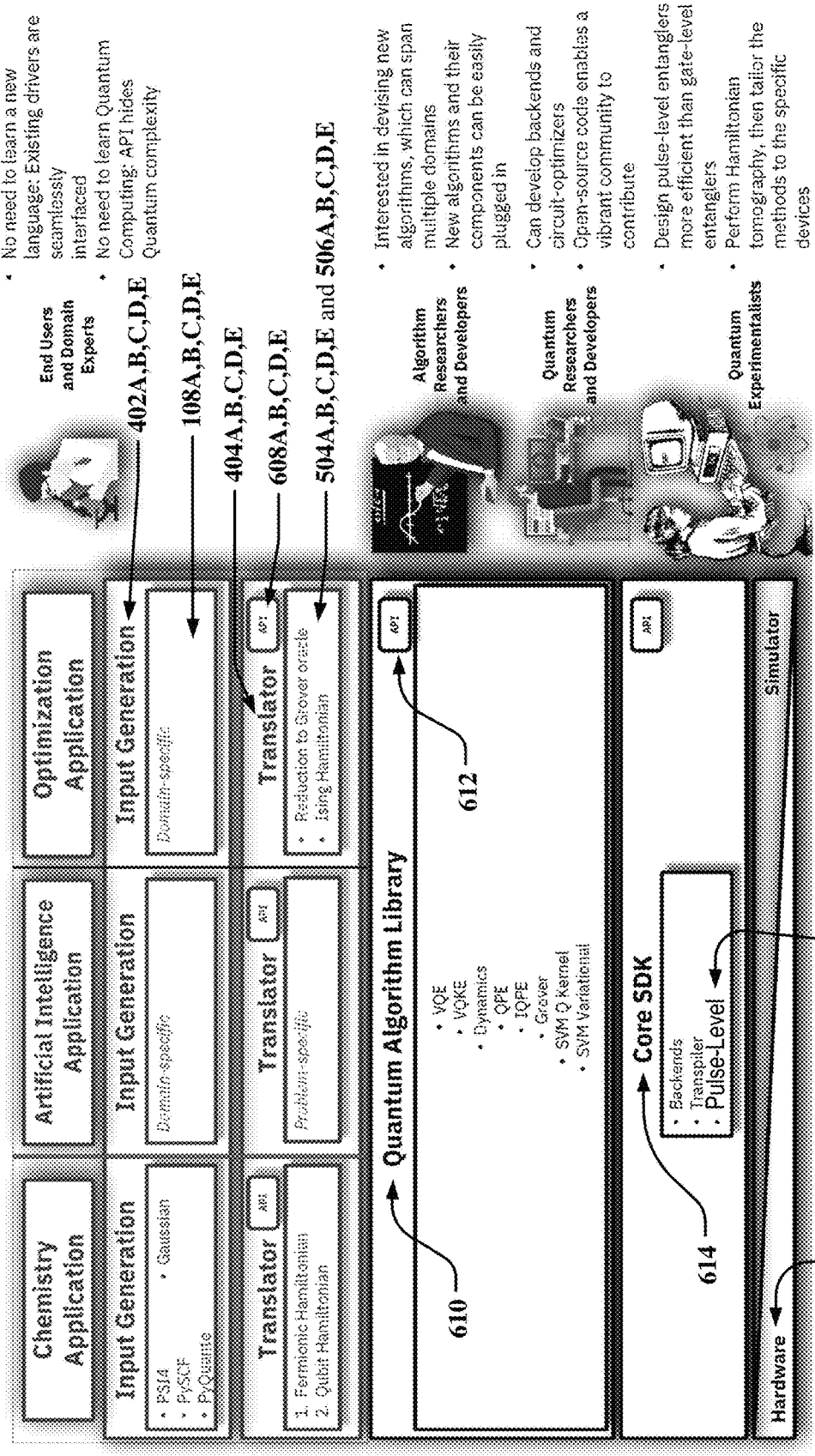
FIG. 6A illustrates an example, non-limiting embodiment of FIG. 6 that facilitates quantum domain computation of classical domain specifications components in accordance with one or more embodiments described herein.

FIG. 6A illustrates an example, non-limiting embodiment of FIG. 6 that facilitates quantum domain computation of classical domain specifications components in accordance with one or more embodiments described herein. Repetitive description of like elements employed in respective embodiments is omitted for sake of brevity. According to multiple embodiments, system 600A can comprise one or more domain-specific API components 608A, 608B, 608C, 608D, 608E, a library of quantum algorithms component 610, a library API component 612, and/or a Quantum Software Development Kit (Quantum SDK) component 614.

According to some embodiments, translator components 404A, 404B, 404C, 404D, 404E can comprise one or more domain-specific API components 602A, 602B, 602C, 602D, 602E. For example, in the chemistry domain, API component 602A can comprise protocols, subroutine definitions, tools, and/or resources to translate a domain-specific operator (e.g., domain-specific operator 504) to a qubit operator (e.g., qubit operator 506).

In some embodiments, library of quantum algorithms component 610 can comprise one or more quantum algorithms In several embodiments, such one or more quantum algorithms can solve one or more problems, such as, for example, energy computation and search.

In some embodiments, library of quantum algorithms component 610 can comprise library API component 612. In several embodiments, library API component 612 can comprise protocols, subroutine definitions, tools, and/or resources to correctly expose the underlying algorithms (e.g., algorithms of the library of quantum algorithms component 610) and ensure that each algorithm is invoked with an input of the appropriate type. For example, library API component 612 can expose one or more algorithms of the library of quantum algorithms component 610 to facilitate such algorithms being invoked through the library API component 612 with the appropriate input.

In some embodiments, Quantum Software Development Kit (Quantum SDK) component 614 can build, compile, and run circuits (e.g., quantum circuit 304). In some embodiments, Quantum Software Development Kit (Quantum SDK) component 614 can comprise kit API component 604. In some embodiments, kit API component 604 can comprise protocols, subroutine definitions, tools, and/or resources to optimize circuits (e.g., quantum circuit 304).

Figure 6B:
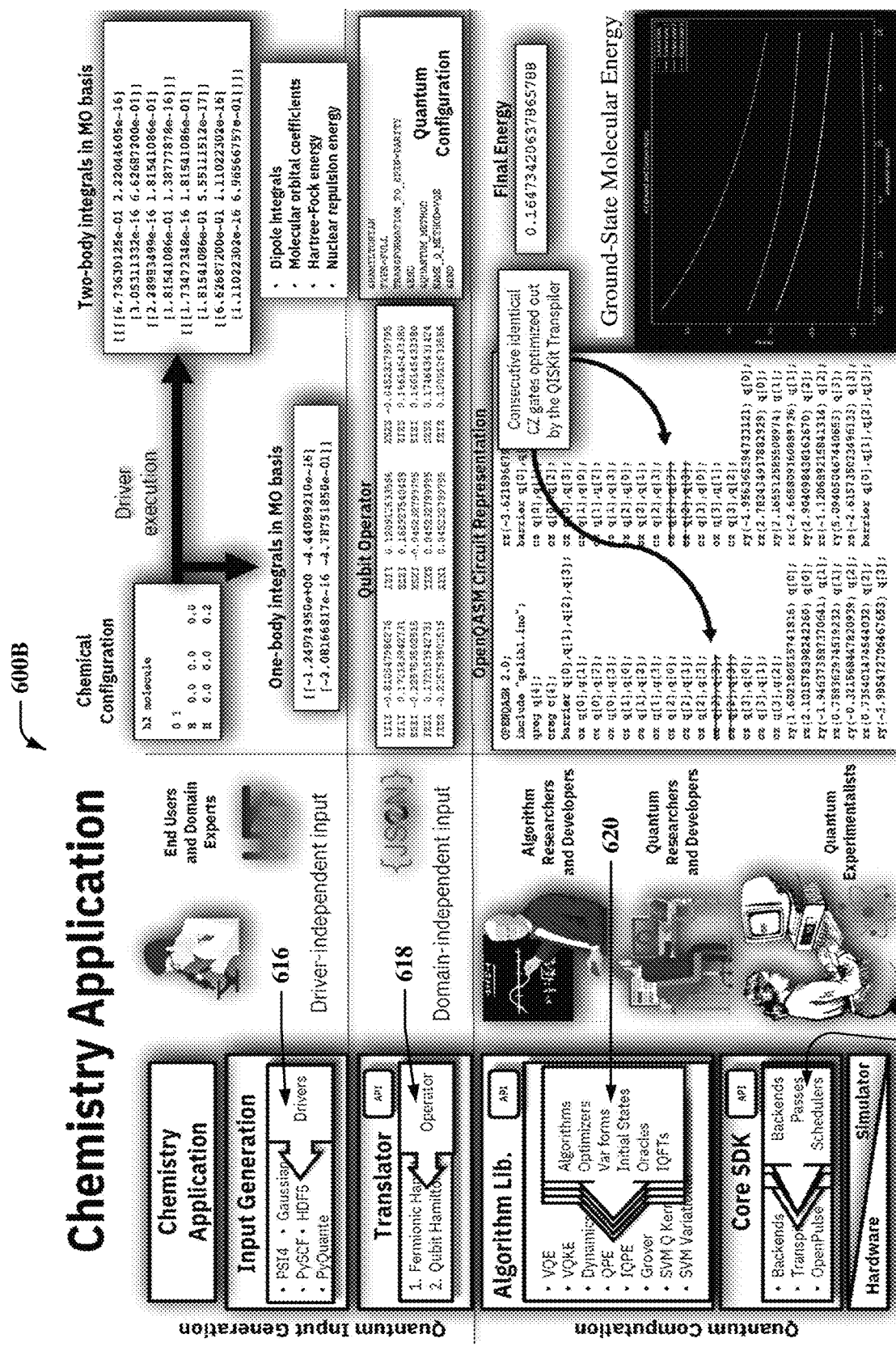
FIG. 6B illustrates a block diagram of an example, non-limiting system that facilitates quantum domain computation of classical domain specifications components in accordance with one or more embodiments described herein.

FIG. 6B illustrates a block diagram of an example, non-limiting system that facilitates quantum domain computation of classical domain specifications components in accordance with one or more embodiments described herein. Repetitive description of like elements employed in respective embodiments is omitted for sake of brevity. According to multiple embodiments, system 600B can comprise an input generation extensibility component 616, a translator extensibility component 618, a circuit generator extensibility component 620, and/or a circuit execution extensibility component 622.

According to several embodiments, such extensibility components listed above (e.g., input generation extensibility component 616, translator extensibility component 618, circuit generator extensibility component 620, and/or circuit execution extensibility component 622) can facilitate extension of one or more components of quantum computation system 102, based on respective component implementations. For example, such extensibility components listed above (e.g., input generation extensibility component 616, translator extensibility component 618, circuit generator extensibility component 620, and/or circuit execution extensibility component 622) can facilitate extension of one or more components of quantum computation system 102, based on respective component implementations input to system 600B, quantum computation system 102, and/or components associated therewith. For instance, system 600B, quantum computation system 102, and/or components associated therewith, can comprise one or more user interfaces described above that enable an entity (e.g., a human) to input (e.g., plug-in) one or more new component implementations to quantum computation system 102, and/or components associated therewith.

In some embodiments, an entity can input new domain-specific driver components via input generation extensibility component 616 (e.g., new drivers). In some embodiments, an entity can input new input generation components via input generation extensibility component 616 (e.g., new mathematical functions to generate domain-specific intermediate data, etc.). In some embodiments, an entity can input new translator components via translator extensibility component 618 (e.g., new mapping functions to translate a domain-specific operator to a qubit operator). In some embodiments, an entity can input new circuit generator components via circuit generator extensibility component 620 (e.g., new quantum algorithms, new quantum algorithm subcomponents, quantum parameters, quantum entanglement parameters, etc.). In some embodiments, an entity can input new circuit optimization components via circuit execution extensibility component 622 (e.g., new backends, and/ or new transpiler that can remove redundancies of a quantum circuit, such as, for example, redundancies 702 illustrated in FIG. 7F). In some embodiments, an entity can input new circuit execution components via circuit execution extensibility component 622 (e.g., new quantum computer, new quantum hardware, new quantum processor, new quantum simulator, new quantum software, etc.).

FIG. 7 illustrates a non-limiting example information of components that facilitate classical domain and quantum domain computations in accordance with one or more embodiments of the disclosed subject matter. According to an embodiment depicted in FIG. 7, the subject disclosure (e.g., quantum computation system 102) can logically distinguish the library of quantum algorithms component 610 from the domain-specific applications (e.g., driver components 108) using the library itself. According to an embodiment depicted in FIG. 7, the subject disclosure (e.g., quantum computation system 102) can further incorporate different classical drivers (e.g., driver components 108, such as, for example, chemistry-specific drivers, as illustrated in FIG. 7). In some embodiments, such drivers (e.g., driver components 108) can be executed classically (to the extent that such computations are not computationally complex) to extract intermediate data from the classical computation that can be input to one or more of the underlying algorithms In some embodiments, Variational algorithms, such as VQE, for example, require the use of an optimizer and a variational form (e.g., one or more optimizers and variational forms illustrated in FIG. 7). According to an embodiment depicted in FIG. 7, the subject disclosure (e.g., quantum computation system 102) can further transparently enforce configuration correctness (e.g., via a JSON schema validation) to ensure that there are no configuration parameters clashing with one another during the execution of a program.

FIG. 7A illustrates a non-limiting example of a classical domain specification 700A that facilitates classical domain computation components in accordance with one or more embodiments of the disclosed subject matter. In some embodiments, classical domain specification 700A can comprise a chemistry-specific computational specification and/or configuration, such as, for example the Hydrogen molecule ($H_2$) configuration as illustrated in FIG. 7A. In some embodiments, such chemistry-specific computational specification and/or configuration can constitute domain-specific input data 110.

FIG. 7B illustrates a non-limiting example of classical domain information 700B that facilitates classical domain computation components in accordance with one or more embodiments of the disclosed subject matter. In some embodiments, classical domain information 700B can comprise chemistry-specific one-body integrals in molecular orbital basis, for example the Hydrogen molecule ($H_2$) one-body integrals in molecular orbital basis configuration illustrated in FIG. 7B. In some embodiments, such chemistry-specific one-body integrals in molecular orbital basis can constitute domain-specific intermediate data 502.

FIG. 7C illustrates a non-limiting example of classical domain information 700C that facilitates classical domain computation components in accordance with one or more embodiments of the disclosed subject matter. In some embodiments, classical domain information 700C can comprise chemistry-specific two-body integrals in molecular orbital basis, for example the Hydrogen molecule ($H_2$) one-body integrals in molecular orbital basis configuration illustrated in FIG. 7C. In some embodiments, such chemistry-specific one-body integrals in molecular orbital basis can constitute domain-specific intermediate data 502.

FIG. 7D illustrates a non-limiting example of a quantum domain configuration 700D that facilitates quantum domain computation components in accordance with one or more embodiments of the disclosed subject matter. In some embodiments, quantum domain configuration 700D can comprise a quantum operator (e.g., a qubit operator). In some embodiments, such quantum domain configuration 700D can constitute quantum-based input data 302.

FIG. 7E illustrates an example, non-limiting declarative-based representation 700E of a quantum domain configuration that facilitates quantum domain computation components in accordance with one or more embodiments described herein. In some embodiments, such declarative-based representation 700E of a quantum domain configuration 700E can constitute quantum-based input data 302.

FIG. 7F illustrates an example, non-limiting representation 700F of a quantum domain circuit that facilitates quantum domain computation components in accordance with one or more embodiments described herein. In some embodiments, such representation 700F of a quantum domain circuit can constitute quantum circuit 304. In some embodiments, representation 700F can comprise one or more redundancies 702 that can be removed by circuit optimization component 202, as described above with reference to FIG. 2 and circuit optimization component 202.

Figure 8:
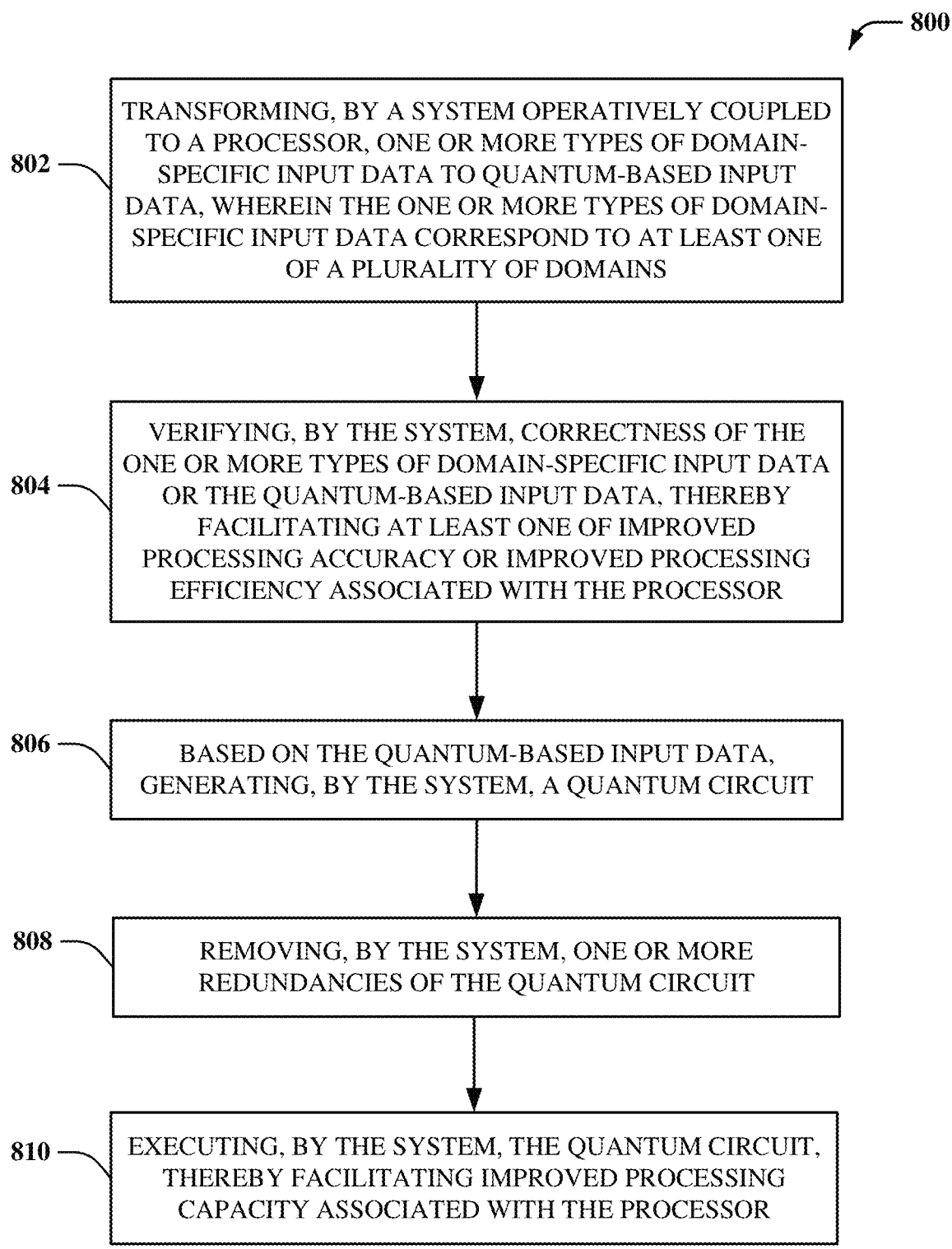
FIG. 8 illustrates a flow diagram of an example, non-limiting computer-implemented method that facilitates quantum domain computation of classical domain specifications components in accordance with one or more embodiments described herein.

FIG. 8 illustrates a flow diagram of an example, non-limiting computer-implemented method 800 that facilitates quantum computation components in accordance with one or more embodiments described herein. Repetitive description of like elements employed in other embodiments described herein is omitted for sake of brevity.

At 802, transforming, by a system (e.g., via quantum computation system 102 and/or input transformation component 112) operatively coupled to a processor (e.g., processor 106), one or more types of domain-specific input data (e.g., domain-specific input data 110) to quantum-based input data (e.g., quantum-based input data 302, qubit operator 700D, and/or quantum configuration 700E). In some embodiments, the one or more types of domain-specific input data can correspond to at least one of a plurality of domains (e.g., chemistry domain, AI domain, CO domain, SO Domain, and/or Finance Domain).

At 804, verifying, by the system (e.g., via quantum computation system 102 and/or configuration verification component 406), correctness of the one or more types of domain-specific input data or the quantum-based input data. In some embodiments, such verification (e.g., via configuration verification component 406) can facilitate improved processing accuracy and/or improved processing efficiency associated with processor 106. For example, such verification (e.g., via configuration verification component 406) prior to processing one or more types of domain-specific input data or the quantum-based input data prevents processing of incorrect data by processor 106, thereby ensuring processor 106 only processes accurate data, which enables processor 106 to: produce accurate processing results; reduce the number of processing cycles needed to produce such accurate processing results; and/or reduce processing time required to process such data.

At 806, based on the quantum-based input data, generating, by the system (e.g., via quantum computation system 102 and/or circuit generator component 114), a quantum circuit (e.g., quantum circuit 304 and/or quantum circuit representation 700F). At 808, removing, by the system (e.g., via quantum computation system 102 and/or circuit optimization component 202), one or more redundancies (e.g., redundancies 702F) of the quantum circuit. At 810, executing, by the system (e.g., via quantum computation system 102 and/or circuit execution component 204), the quantum circuit. In some embodiments, such execution of the quantum circuit can be performed by circuit execution component 204 rather than the processor (e.g., processor 106), thereby facilitating improved processing capacity associated with the processor (e.g., processor 106). For example, by executing the quantum circuit via circuit execution component 204 rather than processor 106, the processing workload of processor 106 is thereby reduced, which improves the processing capacity of processor 106 by enabling processor 106 to execute other processing workloads (e.g., processing workloads that are different from the execution of the quantum circuit).

Figure 9:
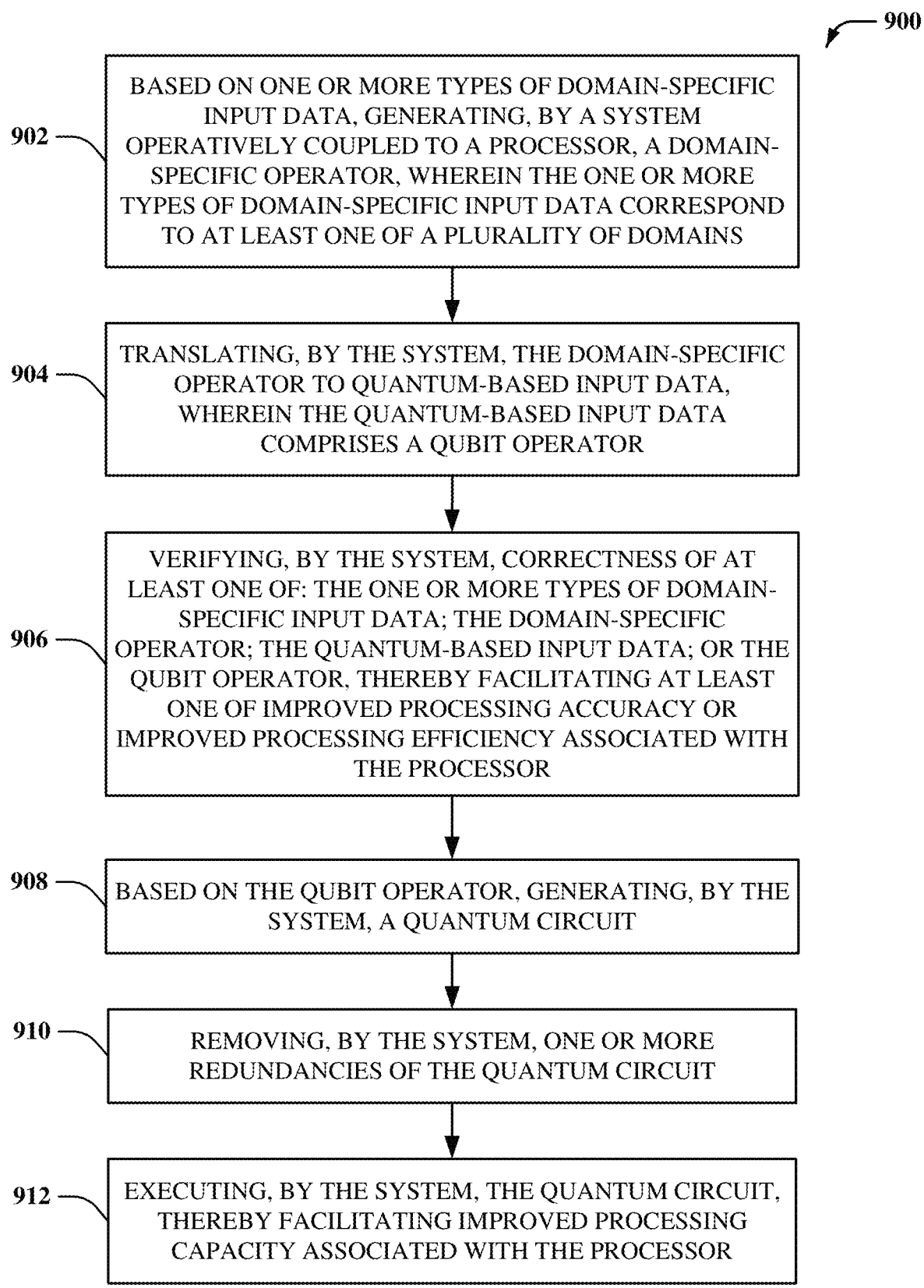
FIG. 9 illustrates a flow diagram of an example, non-limiting computer-implemented method that facilitates quantum domain computation of classical domain specifications components in accordance with one or more embodiments described herein.

FIG. 9 illustrates a flow diagram of an example, non-limiting computer-implemented method 900 that facilitates quantum computation components in accordance with one or more embodiments described herein. Repetitive description of like elements employed in other embodiments described herein is omitted for sake of brevity.

At 902, based on one or more types of domain-specific input data (e.g., domain-specific input data 110), generating, by a system (e.g., via quantum computation system 102, input transformation component 112, input generation component 402, and/or driver component 108) operatively coupled to a processor (e.g., processor 106), a domain-specific operator (e.g., domain-specific operator 504). In some embodiments, the one or more types of domain-specific input data can correspond to at least one of a plurality of domains (e.g., chemistry domain, AI domain, CO domain, SO Domain, and/or Finance Domain).

At 904, translating, by the system (e.g., via quantum computation system 102, input transformation component 112, and/or translator component 404), the domain-specific operator to quantum-based input data (e.g., quantum-based input data 302, qubit operator 700D, and/or quantum configuration 700E). In some embodiments, the quantum-based input data can comprise a qubit operator (e.g., qubit operator 700D).

At 906, verifying, by the system (e.g., via quantum computation system 102 and/or configuration verification component 406), correctness of at least one of: the one or more types of domain-specific input data; the domain-specific operator; the quantum-based input data; or the qubit operator. In some embodiments, such verification (e.g., via configuration verification component 406) can facilitate improved processing accuracy and/or improved processing efficiency associated with processor 106. For example, such verification (e.g., via configuration verification component 406) prior to processing one or more types of domain-specific input data or the quantum-based input data prevents processing of incorrect data by processor 106, thereby ensuring processor 106 only processes accurate data, which enables processor 106 to: produce accurate processing results; reduce the number of processing cycles needed to produce such accurate processing results; and/or reduce processing time required to process such data.

At 908, based on the qubit operator, generating, by the system (e.g., via quantum computation system 102 and/or circuit generator component 114), a quantum circuit (e.g., quantum circuit 304 and/or quantum circuit representation 700F). At 910, removing, by the system (e.g., via quantum computation system 102 and/or circuit optimization component 202), one or more redundancies (e.g., redundancies 702F) of the quantum circuit. At 912, executing, by the system (e.g., via quantum computation system 102 and/or circuit execution component 204), the quantum circuit. In some embodiments, such execution of the quantum circuit can be performed by circuit execution component 204 rather than the processor (e.g., processor 106), thereby facilitating improved processing capacity associated with the processor (e.g., processor 106). For example, by executing the quantum circuit via circuit execution component 204 rather than processor 106, the processing workload of processor 106 is thereby reduced, which improves the processing capacity of processor 106 by enabling processor 106 to execute other processing workloads (e.g., processing workloads that are different from the execution of the quantum circuit).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
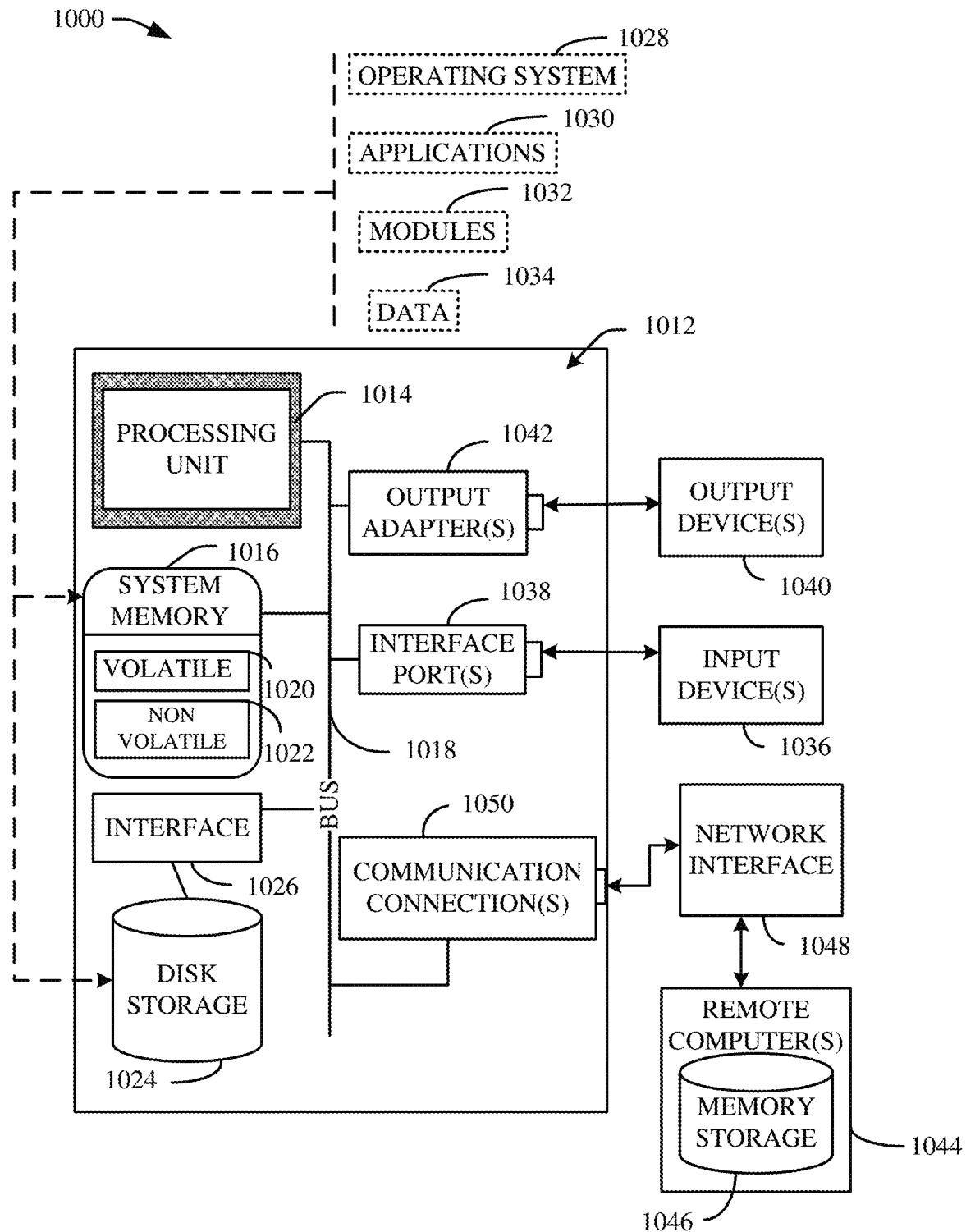
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an input transformation component that transforms domain-specific input data to quantum-based input data;
   a circuit generator component that, based on the quantum-based input data, generates a quantum circuit; and
   a circuit optimization component that removes one or more redundancies of the quantum circuit, wherein a redundancy of the one or more redundancies comprises consecutive identical quantum logic gates of the quantum circuit.

2. The system of claim 1, further comprising a circuit execution component that executes the quantum circuit.

3. The system of claim 2, wherein the circuit execution component is selected from a group consisting of a quantum computer, a quantum device, a quantum machine, a quantum processor, a quantum simulator, and quantum hardware.

4. The system of claim 1, wherein the consecutive identical quantum logic gates are consecutive identical controlled-Z gates.

5. The system of claim 1, further comprising a configuration verification component that verifies correctness of at least one of the domain-specific input data or the quantum-based input data for a domain of the quantum circuit, thereby facilitating at least one of improved processing accuracy or improved processing efficiency associated with the processor.

6. The system of claim 1, wherein the input transformation component comprises:
   an input generation component that, based on the domain-specific input data, generates a domain-specific operator; and a translator component that translates the domain-specific operator to a quantum-based operator.

7. The system of claim 6, wherein the circuit generator component generates the quantum circuit based on the quantum-based operator.

8. The system of claim 1, further comprising a delegation component that, based on the domain-specific input data, delegates one or more computational operations associated with one or more portions of the domain-specific input data to the processor or a quantum device.

9. The system of claim 1, further comprising one or more extensibility components that extend one or more of the computer executable components of the system to perform on or more new functions.

10. The system of claim 1, wherein the quantum circuit comprises a quantum circuit representation indicative of a machine-executable component.

11. A computer program product facilitating a quantum domain computation of classical domain specifications process, the computer program product comprising a non-transitory computer readable medium having program instructions embodied therewith, the program instructions executable by a processor to cause the processor to:
transform, by the processor, domain-specific input data to quantum-based input data;
based on the quantum-based input data, generate, by the processor, a quantum circuit; and
removing, by the processor, one or more redundancies of the quantum circuit, wherein a redundancy of the one or more redundancies comprises consecutive identical quantum logic gates of the quantum circuit.

12. The computer program product of claim 11, wherein the program instructions are further executable by the processor to cause the processor to:
initiate, by the processor, execution of the quantum circuit by a quantum device.

13. The computer program product of claim 11, wherein the wherein the consecutive identical quantum logic gates are consecutive identical controlled-Z gates.

14. The computer program product of claim 11, wherein the program instructions are further executable by the processor to cause the processor to:
verify, by the processor, correctness of at least one of the domain-specific input data or the quantum-based input data for a domain of the quantum circuit, thereby facilitating at least one of improved processing accuracy or improved processing efficiency associated with the processor.

15. A system, comprising:
a memory that stores computer executable components; and
a processor that executes the computer executable components stored in the memory, wherein the computer executable components comprise:
an input transformation component adapted to receive one or more types of domain-specific input data corresponding to at least one of a plurality of domains, wherein the input transformation component transforms the one or more types of domain-specific input data to quantum-based input data;
a circuit generator component that, based on the quantum-based input data, generates a quantum circuit; and
a circuit optimization component that removes one or more redundancies of the quantum circuit, wherein a redundancy of the one or more redundancies comprises consecutive identical quantum logic gates of the quantum circuit.

16. The system of claim 15, further comprising a circuit execution component that executes the quantum circuit.

17. The system of claim 16, wherein the circuit execution component is selected from a group consisting of a quantum computer, a quantum device, a quantum machine, a quantum processor, a quantum simulator, and quantum hardware.

18. The system of claim 15, wherein the consecutive identical quantum logic gates are consecutive identical controlled-Z gates.

19. The system of claim 15, further comprising a configuration verification component that verifies correctness of the one or more types of domain-specific input data or the quantum-based input data for a domain of the quantum circuit, thereby facilitating at least one of improved processing accuracy or improved processing efficiency associated with the processor.

20. The system of claim 15, wherein the plurality of domains comprises multiple computation domains selected from a group consisting of chemistry, artificial intelligence, combinatorial optimization, stochastic optimization, and finance.

21. A computer-implemented method, comprising:
transforming, by a system operatively coupled to a processor, one or more types of domain-specific input data to quantum-based input data, wherein the one or more types of domain-specific input data correspond to at least one of a plurality of domains;
based on the quantum-based input data, generating, by the system, a quantum circuit; and
removing, by the system, one or more redundancies of the quantum circuit, wherein a redundancy of the one or more redundancies comprises consecutive identical quantum logic gates of the quantum circuit.

22. The computer-implemented method of claim 21, further comprising executing, by the system, the quantum circuit using a quantum device.

23. The computer-implemented method of claim 21, wherein the consecutive identical quantum logic gates are consecutive identical controlled-Z gates.

24. The computer-implemented method of claim 21, further comprising verifying, by the system, correctness of the one or more types of domain-specific input data or the quantum-based input data for a domain of the quantum circuit, thereby facilitating at least one of improved processing accuracy or improved processing efficiency associated with the processor.

25. A system, comprising:
a translator component that translates a Hamiltonian operator to a qubit Hamiltonian operator, wherein the Hamiltonian operator is generated from domain-specific input data;
a circuit optimization component that removes one or more redundancies of a quantum circuit generated based on the qubit Hamiltonian operator, wherein a redundancy of the one or more redundancies comprises consecutive identical quantum logic gates of the quantum circuit; and
a circuit execution component that executes a quantum circuit that is generated based on the qubit Hamiltonian operator.

* * * * *